United States Patent
Zewail et al.

(10) Patent No.: US 12,323,355 B2
(45) Date of Patent: Jun. 3, 2025

(54) DEMODULATION REFERENCE SIGNAL DESIGN FOR LARGE SUB-CARRIER SPACING

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Zhifei Fan, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/172,836

(22) Filed: Feb. 10, 2021

(65) Prior Publication Data

US 2021/0320772 A1  Oct. 14, 2021

Related U.S. Application Data

(60) Provisional application No. 63/008,218, filed on Apr. 10, 2020.

(51) Int. Cl.
*H04L 5/00* (2006.01)
*H04J 13/18* (2011.01)
*H04L 25/02* (2006.01)

(52) U.S. Cl.
CPC ............ *H04L 5/0051* (2013.01); *H04J 13/18* (2013.01); *H04L 5/0026* (2013.01); *H04L 5/0042* (2013.01); *H04L 25/0204* (2013.01)

(58) Field of Classification Search
None
See application file for complete search history.

(56) References Cited

U.S. PATENT DOCUMENTS

| | | | |
|---|---|---|---|
| 2020/0266964 A1* | 8/2020 | Kang | H04W 80/02 |
| 2020/0336355 A1 | 10/2020 | Yamada et al. | |

FOREIGN PATENT DOCUMENTS

| | | | |
|---|---|---|---|
| CN | 110546911 A | 12/2019 | |
| CN | 110679111 A | 1/2020 | |

(Continued)

OTHER PUBLICATIONS

Panasonic: "On Remaining Details of NR DL DMRS", 3GPP Draft, 3GPP TSG RAN WG1 Meeting 90bis, R1-1718367 NR DMRS VFinal, 3rd Generation Partnership Project (3GPP), Mobile Competence Centre, 650, Route Des Lucioles, F-06921 Sophia-Antipolis Cedex, France, vol. RAN WG1. No. Prague. Czech Republic, Oct. 9, 2017-Oct. 13, 2017, Oct. 8, 2017 (Oct. 8, 2017), XP051341550, 10 Pages, Retrieved from the Internet: URL: http://www.3gpp.org/ftp/Meetings_3GPP_SYNC/RAN1/Docs/. [retrieved on Oct. 8, 2017] pp. 3. 5 tables 3a-3d.

(Continued)

*Primary Examiner* — Yemane Mesfin
*Assistant Examiner* — Jeff Banthrongsack
(74) *Attorney, Agent, or Firm* — Paul M. McAdams; Harrity & Harrity, LLP

(57) ABSTRACT

Various aspects of the present disclosure generally relate to wireless communication. In some aspects, a user equipment may receive a demodulation reference signal (DMRS) configuration that indicates a code-division multiplexing (CDM) group configured for the UE; receive a first indication of an antenna port, included in the CDM group, assigned to the UE for reception of a first set of DMRS transmissions; receive a second indication of whether a second set of DMRS transmissions for another antenna port, included in the CDM group, is present or absent for another UE; and perform channel estimation based at least in part on the first indication of the antenna port and the second (Continued)

indication of whether the second set of DMRS transmissions for the other antenna port is present or absent. Numerous other aspects are provided.

15 Claims, 21 Drawing Sheets

(56) References Cited

FOREIGN PATENT DOCUMENTS

| | | | |
|---|---|---|---|
| CN | 110945816 A | 3/2020 | |
| EP | 3468061 A1 * | 4/2019 | ........... H04B 7/0452 |
| EP | 3955502 A1 * | 2/2022 | ........... H04L 5/0016 |
| WO | WO-2019130847 A1 | 7/2019 | |
| WO | WO-2019154238 A1 | 8/2019 | |
| WO | WO-2020002662 A1 * | 1/2020 | .......... H04J 11/0036 |

OTHER PUBLICATIONS

Partial International Search Report—PCT/US2021/017606—ISA/EPO—Jun. 15, 2021.
"3rd Generation Partnership Project; Technical Specification Group Radio Access Network; NR; Multiplexing and Channel Coding (Release 15)", 3GPP TS 38.212, V15.3.0 (Sep. 2018), pp. 1-95.
International Search Report and Written Opinion—PCT/US2021/017606—ISA/EPO—Oct. 7, 2021.

* cited by examiner

| Value | One Codeword:<br>Codeword 0 enabled<br>Codeword 1 disabled | |
|---|---|---|
| | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 1 | 0 is used and 1 is absent |
| ... | ... | ... |

| One Codeword: Codeword 0 enabled Codeword 1 disabled | | | |
|---|---|---|---|
| Value | Number of DMRS CDM group(s) without data | DMRS port(s) | Number of front-loaded symbols |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 1 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| ... | ... | ... | ... |
| 30 | 2 | 0, 2, 4, 6 | 2 |
| 31 | 1 | 0 is used and 1 is absent | 1 |
| 32 | 2 | 0 is used and 1 is absent | 1 |
| ... | | | |

| Value | UE 0 One Codeword: Codeword 0 enabled Codeword 1 disabled | | |
|---|---|---|---|
| | Number of DMRS CDM group(s) without data | DMRS port(s) | Number of front-load symbols |
| 0 | 1 | 0 is used and 1 is present | 1 |
| 1 | 1 | 0 is used and 1 is absent | 1 |

1105

| Value | UE 1 One Codeword: Codeword 0 enabled Codeword 1 disabled | | |
|---|---|---|---|
| | Number of DMRS CDM group(s) without data | DMRS port(s) | Number of front-load symbols |
| 0 | 1 | 1 is used and 0 is present | 1 |
| 1 | 1 | 1 is used and 0 is absent | 1 |

| Value | One Codeword:<br>Codeword 0 enabled<br>Codeword 1 disabled | |
|---|---|---|
| | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 1 | 0 and 2, single virtual port |

| Value | One Codeword: Codeword 0 enabled Codeword 1 disabled | | |
|---|---|---|---|
| | Number of DMRS CDM group(s) without data | DMRS port(s) | Number of front-load symbols |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 1 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| | | | |
| 30 | 2 | 0, 2, 4, 6 | 2 |
| 31 | 1 | 0 and 2, single virtual port | 1 |
| 32 | 2 | 0 and 2, single virtual port | 1 |

| Value | UE 0 | | |
|---|---|---|---|
| | One Codeword:<br>Codeword 0 enabled<br>Codeword 1 disabled | | |
| | Number of DMRS CDM group(s) without data | DMRS port(s) | Number of front-load symbols |
| 0 | 1 | 0 and 2, single virtual port | 1 |

1505

| Value | UE 1 | | |
|---|---|---|---|
| | One Codeword:<br>Codeword 0 enabled<br>Codeword 1 disabled | | |
| | Number of DMRS CDM group(s) without data | DMRS port(s) | Number of front-load symbols |
| 0 | 1 | 1 and 3, single virtual port | 1 |

DEMODULATION REFERENCE SIGNAL DESIGN FOR LARGE SUB-CARRIER SPACING

CROSS-REFERENCE TO RELATED APPLICATION

This Patent Application claims priority to U.S. Provisional Patent Application No. 63/008,218, filed on Apr. 10, 2020, entitled "DEMODULATION REFERENCE SIGNAL DESIGN FOR LARGE SUB-CARRIER SPACING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal design for large sub-carrier spacing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a demodulation reference signal (DMRS) configuration that indicates a code-division multiplexing (CDM) group configured for the UE; receiving a first indication of an antenna port, included in the CDM group, assigned to the UE for reception of a first set of DMRS transmissions; receiving a second indication of whether a second set of DMRS transmissions for another antenna port, included in the CDM group, is present or absent for another UE; and performing channel estimation based at least in part on the first indication of the antenna port and the second indication of whether the second set of DMRS transmissions for the other antenna port is present or absent.

In some aspects, a method of wireless communication, performed by a base station, may include transmitting a DMRS configuration that indicates a CDM group configured for a UE; transmitting a first indication of an antenna port, included in the CDM group, assigned to the UE for reception of a first set of DMRS transmissions; transmitting a second indication of whether a second set of DMRS transmissions for another antenna port, included in the CDM group, is present or absent for another UE; and transmitting the first set of DMRS transmissions based at least in part on the first indication and the second indication.

In some aspects, a method of wireless communication, performed by a user equipment, may include receiving a DMRS configuration that indicates a first CDM group and a second CDM group configured for the UE; receiving an indication that a first antenna port included in the first CDM group and a second antenna port included in the second CDM group are to be combined into a single virtual port for a set of DMRS transmissions; and performing channel estimation using the single virtual port based at least in part on the indication that the first antenna port and the second antenna port are to be combined.

In some aspects, a method of wireless communication, performed by a base station, may include transmitting a DMRS configuration that indicates a first CDM group and a second CDM group configured for a UE; transmitting an indication that a first antenna port included in the first CDM group and a second antenna port included in the second CDM group are to be combined into a single virtual port for a set of DMRS transmissions; and transmitting the set of DMRS transmissions using the single virtual port based at least in part on the indication that the first antenna port and the second antenna port are to be combined.

In some aspects, a UE for wireless communication may include a memory and one or more processors operatively coupled to the memory. The memory and the one or more processors may be configured to receive a DMRS configuration that indicates a CDM group configured for the UE; receive a first indication of an antenna port, included in the CDM group, assigned to the UE for reception of a first set of DMRS transmissions; receive a second indication of whether a second set of DMRS transmissions for another antenna port, included in the CDM group, is present or absent for another UE; and perform channel estimation based at least in part on the first indication of the antenna port and the second indication of whether the second set of DMRS transmissions for the other antenna port is present or absent.

In some aspects, a base station for wireless communication may include a memory and one or more processors operatively coupled to the memory. The memory and the one or more processors may be configured to transmit a DMRS configuration that indicates a CDM group configured for a UE; transmit a first indication of an antenna port, included in the CDM group, assigned to the UE for reception of a first set of DMRS transmissions; transmit a second indication of whether a second set of DMRS transmissions for another antenna port, included in the CDM group, is present or absent for another UE; and transmit the first set of DMRS transmissions based at least in part on the first indication and the second indication.

In some aspects, a UE for wireless communication may include a memory and one or more processors operatively coupled to the memory. The memory and the one or more processors may be configured to receive a DMRS configuration that indicates a first CDM group and a second CDM group configured for the UE; receive an indication that a first antenna port included in the first CDM group and a second antenna port included in the second CDM group are to be combined into a single virtual port for a set of DMRS transmissions; and perform channel estimation using the single virtual port based at least in part on the indication that the first antenna port and the second antenna port are to be combined.

In some aspects, a base station for wireless communication may include a memory and one or more processors operatively coupled to the memory. The memory and the one or more processors may be configured to transmit a DMRS configuration that indicates a first CDM group and a second CDM group configured for a UE; transmit an indication that a first antenna port included in the first CDM group and a second antenna port included in the second CDM group are to be combined into a single virtual port for a set of DMRS transmissions; and transmit the set of DMRS transmissions using the single virtual port based at least in part on the indication that the first antenna port and the second antenna port are to be combined.

In some aspects, a non-transitory computer-readable medium may store one or more instructions for wireless communication. The one or more instructions, when executed by one or more processors of a UE, may cause the one or more processors to receive a DMRS configuration that indicates a CDM group configured for the UE; receive a first indication of an antenna port, included in the CDM group, assigned to the UE for reception of a first set of DMRS transmissions; receive a second indication of whether a second set of DMRS transmissions for another antenna port, included in the CDM group, is present or absent for another UE; and perform channel estimation based at least in part on the first indication of the antenna port and the second indication of whether the second set of DMRS transmissions for the other antenna port is present or absent.

In some aspects, a non-transitory computer-readable medium may store one or more instructions for wireless communication. The one or more instructions, when executed by one or more processors of a base station, may cause the one or more processors to transmit a DMRS configuration that indicates a CDM group configured for a UE; transmit a first indication of an antenna port, included in the CDM group, assigned to the UE for reception of a first set of DMRS transmissions; transmit a second indication of whether a second set of DMRS transmissions for another antenna port, included in the CDM group, is present or absent for another UE; and transmit the first set of DMRS transmissions based at least in part on the first indication and the second indication.

In some aspects, a non-transitory computer-readable medium may store one or more instructions for wireless communication. The one or more instructions, when executed by one or more processors of a UE, may cause the one or more processors to receive a DMRS configuration that indicates a first CDM group and a second CDM group configured for the UE; receive an indication that a first antenna port included in the first CDM group and a second antenna port included in the second CDM group are to be combined into a single virtual port for a set of DMRS transmissions; and perform channel estimation using the single virtual port based at least in part on the indication that the first antenna port and the second antenna port are to be combined.

In some aspects, a non-transitory computer-readable medium may store one or more instructions for wireless communication. The one or more instructions, when executed by one or more processors of a base station, may cause the one or more processors to transmit a DMRS configuration that indicates a first CDM group and a second CDM group configured for a UE; transmit an indication that a first antenna port included in the first CDM group and a second antenna port included in the second CDM group are to be combined into a single virtual port for a set of DMRS transmissions; and transmit the set of DMRS transmissions using the single virtual port based at least in part on the indication that the first antenna port and the second antenna port are to be combined.

In some aspects, an apparatus for wireless communication may include means for receiving a DMRS configuration that indicates a CDM group configured for the apparatus; means for receiving a first indication of an antenna port, included in the CDM group, assigned to the apparatus for reception of a first set of DMRS transmissions; means for receiving a second indication of whether a second set of DMRS transmissions for another antenna port, included in the CDM group, is present or absent for another apparatus; and means for performing channel estimation based at least in part on the first indication of the antenna port and the second indication of whether the second set of DMRS transmissions for the other antenna port is present or absent.

In some aspects, an apparatus for wireless communication may include means for transmitting a DMRS configuration that indicates a CDM group configured for a UE; means for transmitting a first indication of an antenna port, included in the CDM group, assigned to the UE for reception of a first set of DMRS transmissions; means for transmitting a second indication of whether a second set of DMRS transmissions for another antenna port, included in the CDM group, is present or absent for another UE; and means for transmitting the first set of DMRS transmissions based at least in part on the first indication and the second indication.

In some aspects, an apparatus for wireless communication may include means for receiving a DMRS configuration that indicates a first CDM group and a second CDM group configured for the apparatus; means for receiving an indication that a first antenna port included in the first CDM group and a second antenna port included in the second CDM group are to be combined into a single virtual port for a set of DMRS transmissions; and means for performing channel estimation using the single virtual port based at least in part on the indication that the first antenna port and the second antenna port are to be combined.

In some aspects, an apparatus for wireless communication may include means for transmitting a DMRS configuration that indicates a first CDM group and a second CDM group configured for a UE; means for transmitting an indication that a first antenna port included in the first CDM group and a second antenna port included in the second CDM group are to be combined into a single virtual port for a set of DMRS transmissions; and means for transmitting the set of DMRS transmissions using the single virtual port based at least in part on the indication that the first antenna port and the second antenna port are to be combined.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-17 are diagrams illustrating examples associated with demodulation reference signal (DMRS) design for large sub-carrier spacing, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
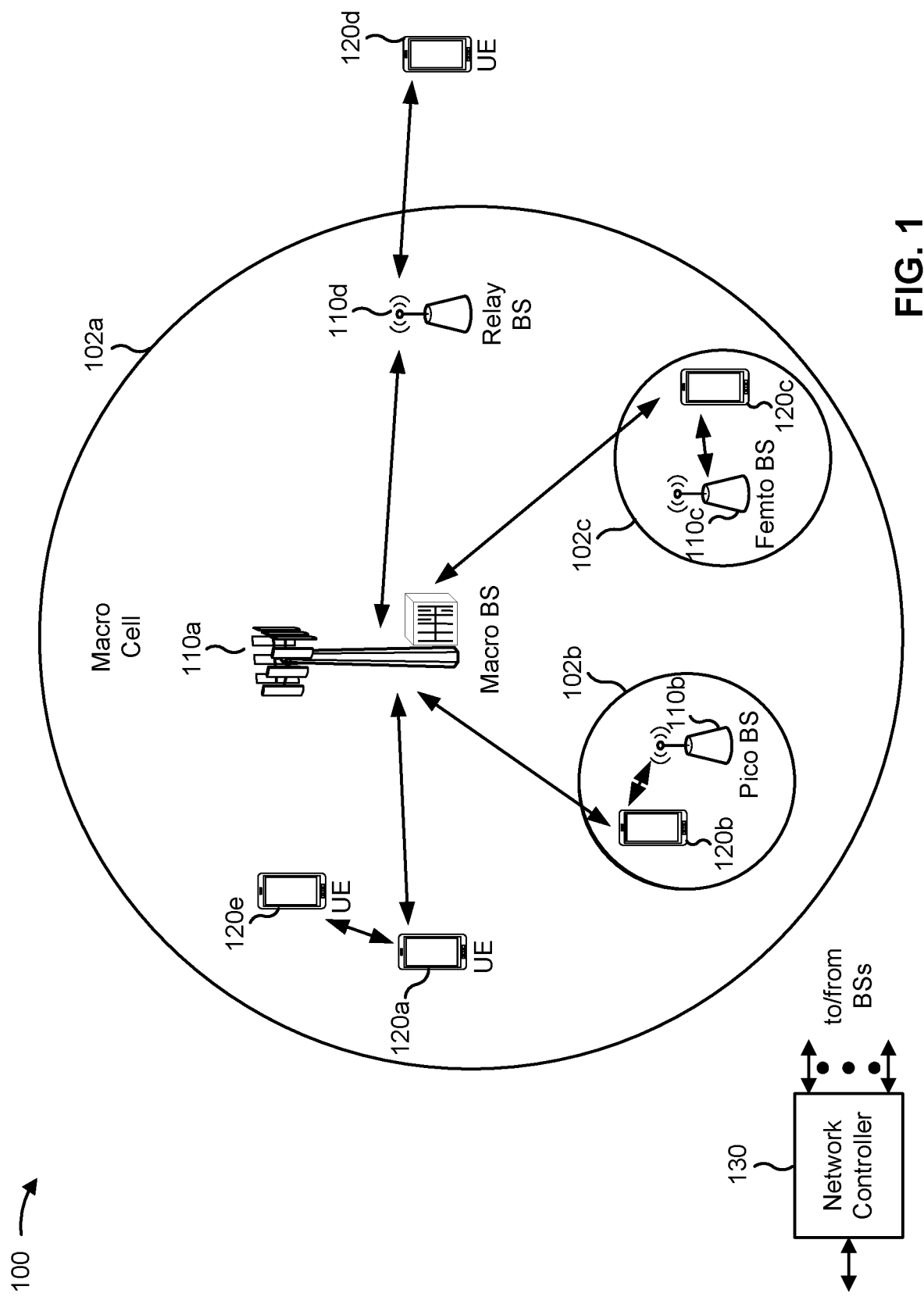
FIG. 1 is a block diagram conceptually illustrating an example of a wireless communication network, in accordance with the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
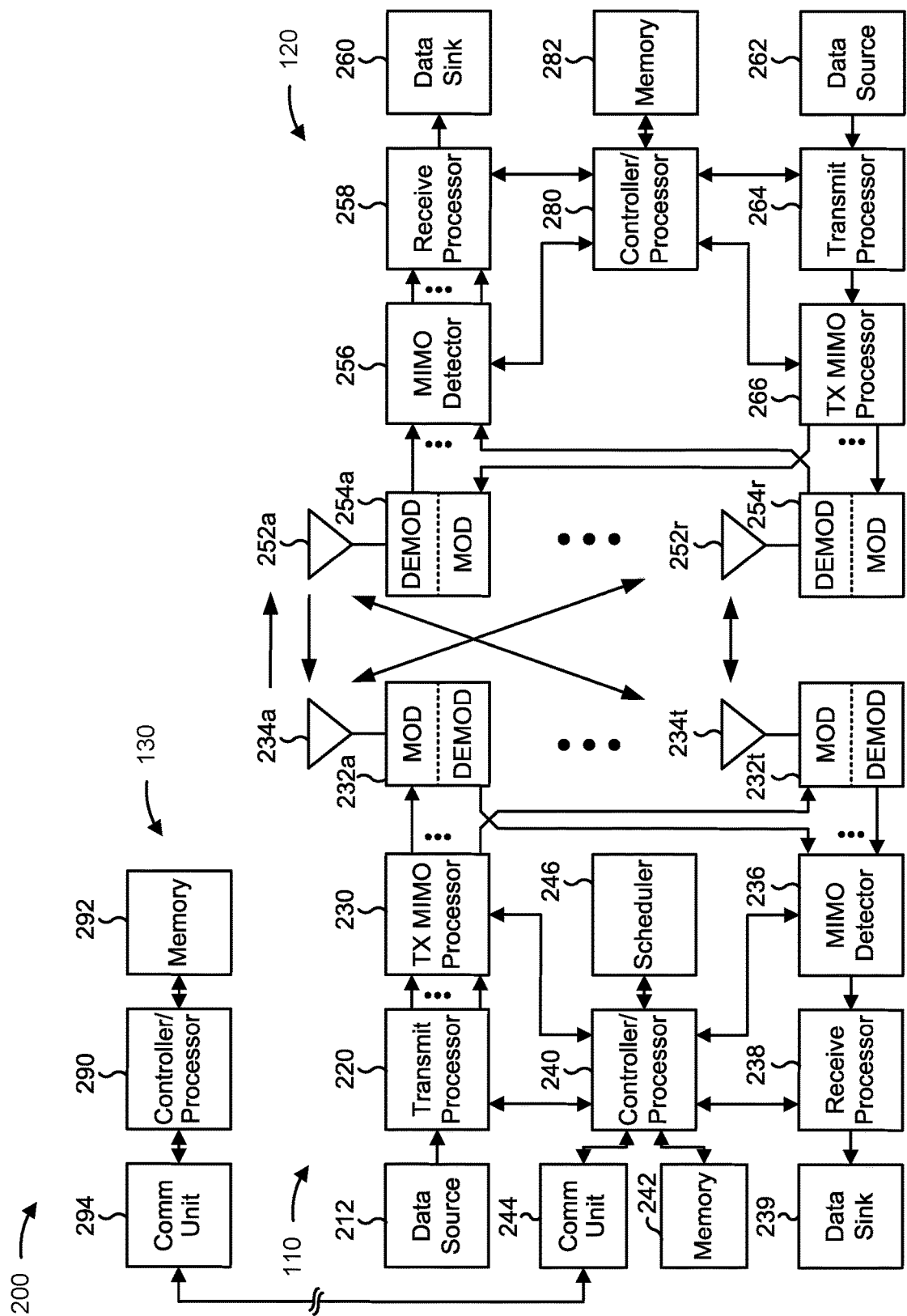
FIG. 2 is a block diagram conceptually illustrating an example of a base station in communication with a UE in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with demodulation reference signal design for large sub-carrier spacing, as described in more detail elsewhere herein. For example, controller/processor 240 of base station 110, controller/processor 280 of UE 120, and/or any other component(s) of FIG. 2 may perform or direct operations of, for example, process 1800 of FIG. 18, process 1900 of FIG. 19, process 2000 of FIG. 20, process 2100 of FIG. 21, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1800 of FIG. 18, process 1900 of FIG. 19, process 2000 of FIG. 20, process 2100 of FIG. 21, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a demodulation reference signal (DMRS) configuration that indicates a code-division multiplexing (CDM) group configured for the UE; means for receiving a first indication of an antenna port, included in the CDM group, assigned to the UE for reception of a first set of DMRS transmissions; means for receiving a second indication of whether a second set of DMRS transmissions for another antenna port, included in the CDM group, is present or absent for another UE; means for performing channel estimation based at least in part on the first indication of the antenna port and the second indication of whether the second set of DMRS transmissions for the other antenna port is present or absent; and/or the like. Additionally, or alternatively, UE 120 may include means for receiving a DMRS configuration that indicates a first CDM group and a second CDM group configured for the UE; means for receiving an indication that a first antenna port included in the first CDM group and a second antenna port included in the second CDM group are to be combined into a single virtual port for a set of DMRS transmissions; means for performing channel estimation using the single virtual port based at least in part on the indication that the first antenna port and the second antenna port are to be combined; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a DMRS configuration that indicates a CDM group configured for a UE; means for transmitting a first indication of an antenna port, included in the CDM group, assigned to the UE for reception of a first set of DMRS transmissions; means for transmitting a second indication of whether a second set of DMRS transmissions for another antenna port, included in the CDM group, is present or absent for another UE; means for transmitting the first set of DMRS transmissions based at least in part on the first indication and the second indication; and/or the like. Additionally, or alternatively, base station 110 may include means for transmitting a DMRS configuration that indicates a first CDM group and a second CDM group configured for a UE; means for transmitting an indication that a first antenna port included in the first CDM group and a second antenna port included in the second CDM group are to be combined into a single virtual port for a set of DMRS transmissions; means for transmitting the set of DMRS transmissions using the single virtual port based at least in part on the indication that the first antenna port and the second antenna port are to be combined; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
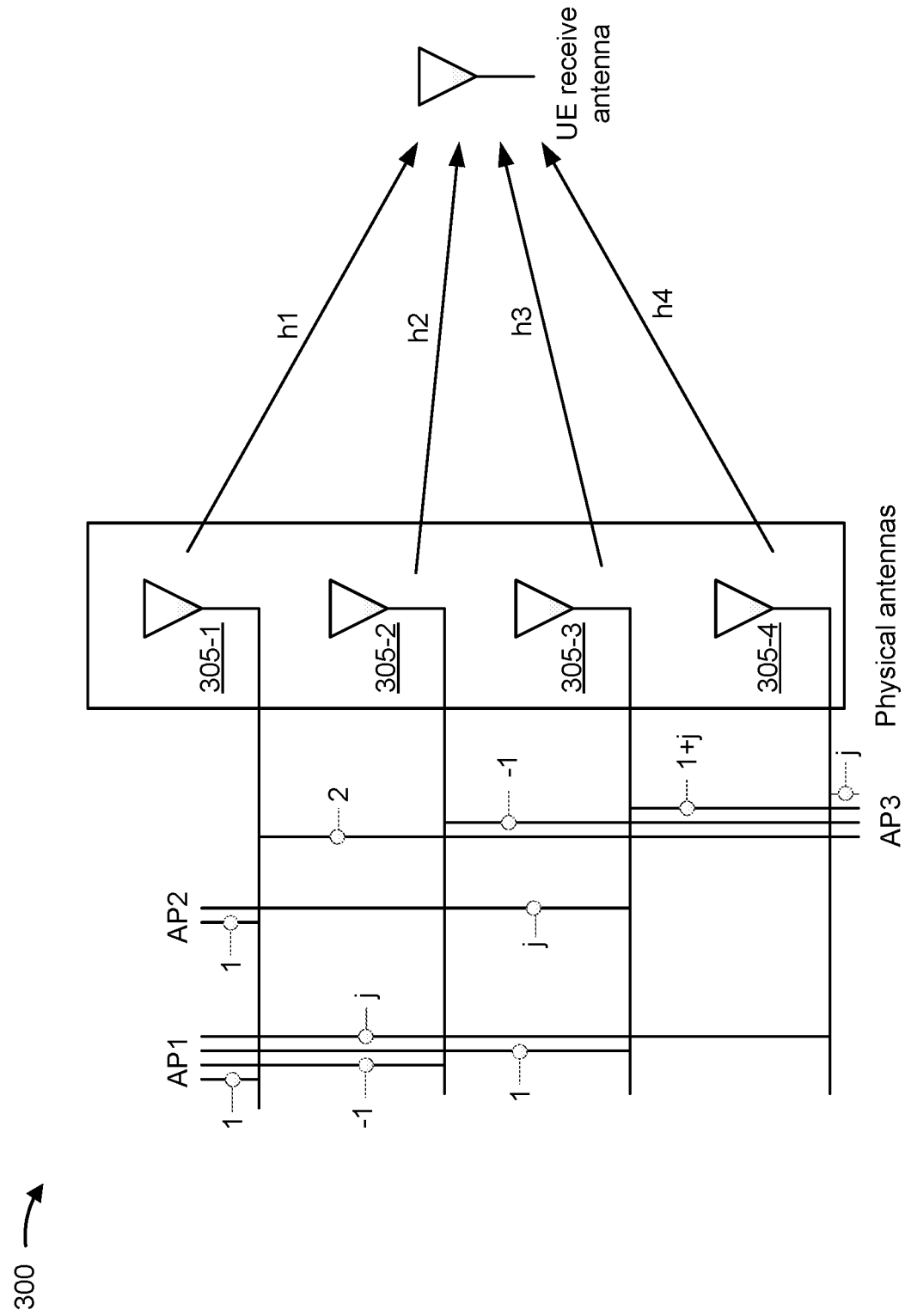
FIG. 3 is a diagram illustrating an example of antenna ports, in accordance with the present disclosure.

FIG. 3 is a diagram illustrating an example 300 of antenna ports, in accordance with various aspects of the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel Such weighting factors may be applied to the channels to improve signal power and/or signal quality at one or more receivers. Applying such weighting factors to channel transmissions may be referred to as precoding, and a specific set of weighting factors applied to a set of channels may be referred to as a precoder.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 3 is provided merely as an example. Other examples may differ from what is described with regard to FIG. 3.

Figure 4:
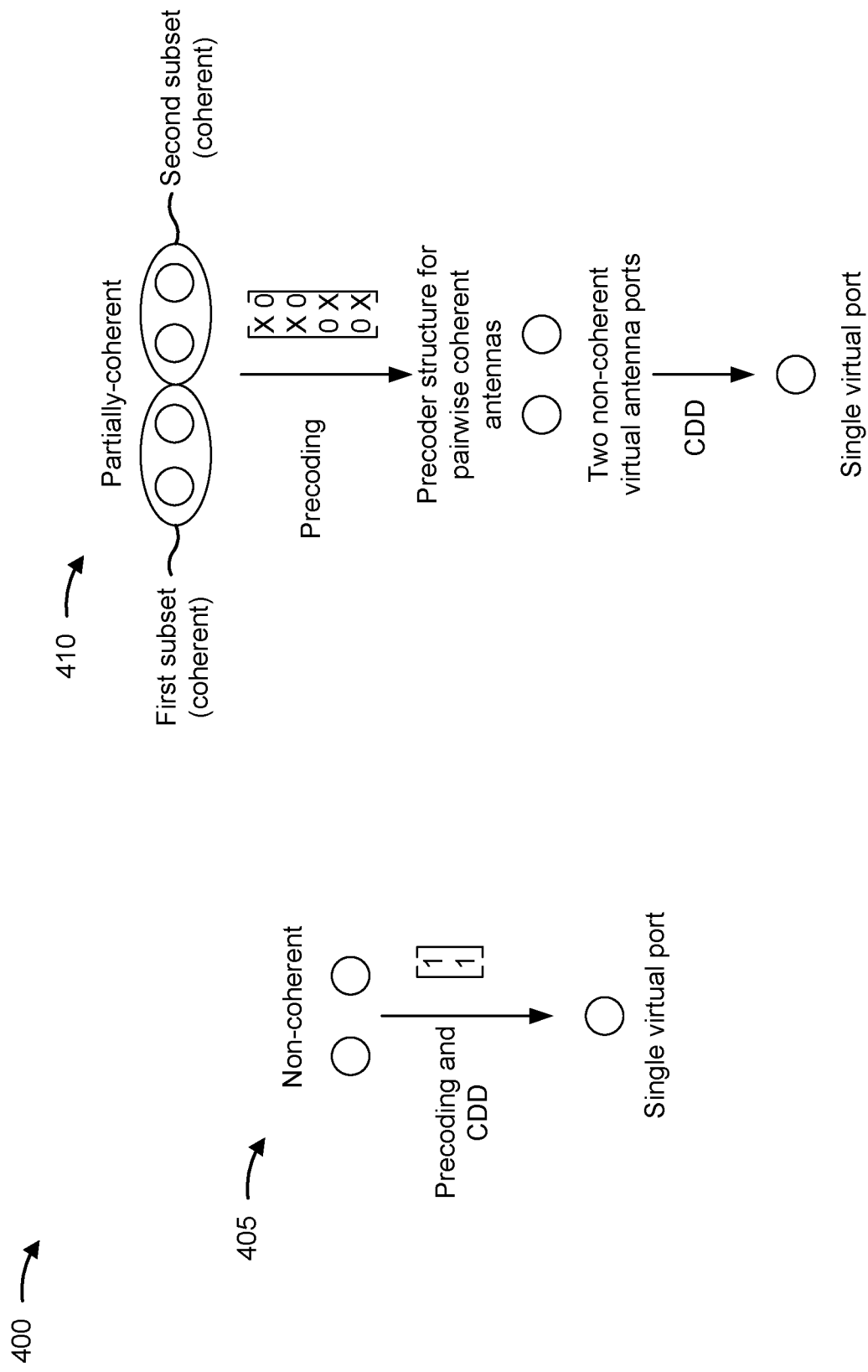
FIG. 4 is a diagram illustrating two examples of forming a virtual antenna port by combining non-coherent and/or partially-coherent antenna ports, in accordance with the present disclosure.

FIG. 4 is a diagram illustrating two examples 400 of forming a virtual antenna port by combining non-coherent and/or partially-coherent antenna ports, in accordance with various aspects of the present disclosure.

The antennas of a multi-antenna UE (e.g., UE 120) may be classified into one of three groups depending on coherence of the antenna ports of the UE. A set of antenna ports (for example, two antenna ports) are coherent if the relative phase among the set of antenna ports (for example, between the two antenna ports) remains the same between the time of an SRS transmission from those antenna ports and a subsequent physical uplink shared channel (PUSCH) transmission from those antenna ports. In this case, the SRS may be used (for example, by the UE or a BS) to determine an uplink precoder for precoding the PUSCH transmission, because the relative phase of the antenna ports will be the same for the SRS transmission and the PUSCH transmission. The precoding may span across the set of coherent antenna ports.

If a set of antenna ports is non-coherent, then such uplink precoder determination becomes difficult, because the relative phase between the antenna ports will change from the SRS transmission to the PUSCH transmission. For example, a set of antenna ports is considered non-coherent if the relative phase among the set of antenna ports is different for the SRS transmission than for the PUSCH transmission. In this case, the use of the same uplink precoder for a set of non-coherent antenna ports may result in the UE applying improper or inaccurate precoding weights (such as phase and gain weights) to the data streams transmitted from the non-coherent antenna ports. Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within each of the respective subsets of coherent antenna ports, but not across the different subsets of non-coherent antenna ports.

In some cases, when a BS schedules a PUSCH transmission for a multi-antenna UE having non-coherent or partially-coherent antenna ports, the signaling communication that schedules the PUSCH transmission may identify an uplink precoder that is to be used to precode the PUSCH transmission. Conventionally, because the antenna ports of the UE are non-coherent (or, in the case of partially coherent antenna ports, are non-coherent groups of coherent antenna ports), the UE may be capable of using the uplink precoder for only one of the antenna ports (or antenna port groups) while other antenna ports (or antenna port groups) are not used for the PUSCH transmission. Because only a subset of non-coherent or partially coherent antenna ports are used, this may result in decreased transmit power of the PUSCH transmission, decreased reliability of the PUSCH transmission (due to lack of transmit or spatial diversity), or the like.

To utilize some or all of the non-coherent or partially coherent antenna ports, the UE may apply various techniques to synthesize non-coherent or partially coherent antenna ports into a virtual antenna port so that common precoding may be used on the virtual antenna port and applied across the non-coherent antenna ports. A virtual (or logical) antenna port may represent a combination of two or more antenna ports. This allows a BS to select an uplink precoder for the virtual antenna port, and allows the UE to use the uplink precoder to transmit on the otherwise non-coherent or partially coherent antenna ports that have been combined to form the virtual antenna port.

For example, as shown by reference number 405, a set of non-coherent antenna ports (e.g., shown as two non-coherent antenna ports) can be combined into a single virtual port using precoding (e.g., uplink precoding) and cyclic delay diversity. The precoder may be determined by the UE 120 and/or signaled by a base station 110. Cyclic delay diversity (CDD) may refer to a technique where a delay (e.g., a cyclic delay) is introduced on one of the non-coherent antenna ports and not the other non-coherent antenna port. The delay may be measured in samples (e.g., 5 samples, 10 samples, and/or the like), fractions of samples, and/or the like. For example, a first non-coherent antenna port may transmit a first stream of samples, and the second non-coherent antenna port may transmit a second stream of samples (e.g., which may be the same stream) with a slight cyclic delay (e.g., a delay of 5 samples, 10 samples, and/or the like). For example, for a cyclic delay of 5 samples, where 16 samples are transmitted per symbol, the first non-coherent antenna port may transmit the 16 samples with a first sample transmitted first (e.g., [s1, s2, s3, s4, . . . , s16]), and the second non-coherent antenna port may transmit the 16 samples with the first sample transmitted sixth (e.g., with a delay of five samples) (e.g., [s12, s13, s14, s15, s16, s1, s2, s3, . . . , s11]).

Additionally, or alternatively, as shown by reference number 410, a set of partially-coherent antenna ports can be combined into a single virtual antenna port using precoding (e.g., uplink precoding) and cyclic delay diversity, in a similar manner as described above. As shown, a first subset of antenna ports may be coherent with one another, and a second subset of antenna ports may be coherent with one another, but the two subsets may not be coherent with one another. As further shown, precoding may be applied to the individual subsets to generate a first virtual antenna port and a second virtual antenna port that are not coherent with one another. Then, CDD may be applied to these two virtual antenna ports (e.g., by transmitting communications from the virtual antenna ports using CDD), thereby forming a single virtual antenna port from the partially-coherent antenna ports (e.g., using precoding and CDD).

Although FIG. 4 shows pairs of antenna ports in sets and subsets, in some aspects, a different number of antenna ports may be included in a set or a subset. For example, a set of antenna ports or subset of antenna ports may include three antenna ports, four antenna ports, and/or the like.

As indicated above, FIG. 4 is provided as one or more examples. Other examples are possible and may differ from what is described with regard to FIG. 4.

Figure 5:
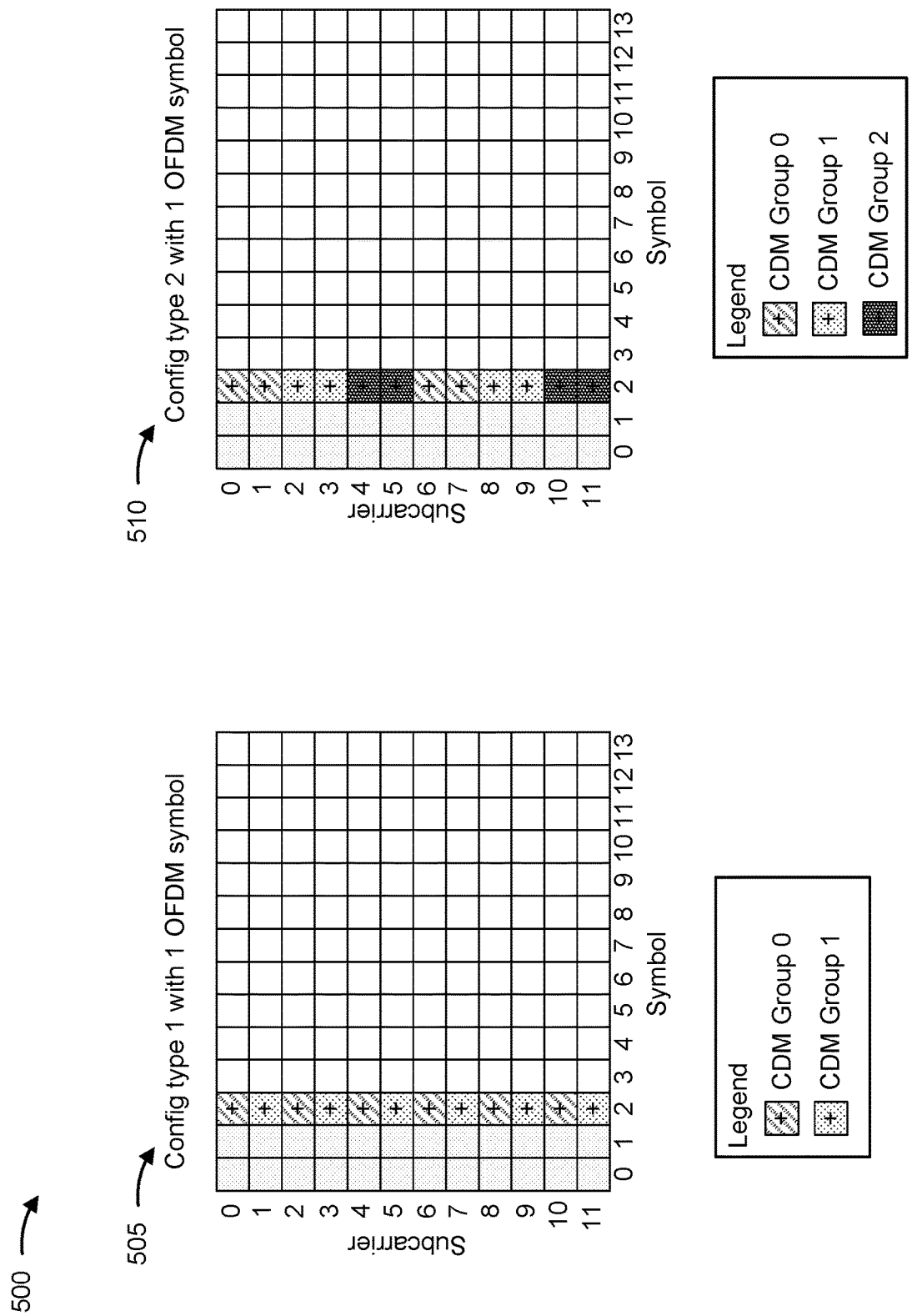
FIGS. 5-7 are diagrams illustrating examples of code division multiplexing (CDM) groups, in accordance with the present disclosure.

FIG. 5 is a diagram illustrating an example 500 of code division multiplexing (CDM) groups, in accordance with various aspects of the present disclosure. In a wireless communication system, multiple demodulation reference signal (DMRS) ports can be used to transmit on the same orthogonal frequency division multiplexing (OFDM) symbol using CDM and frequency division multiplexing (FDM). Using FDM, different DMRS ports can be used for transmission of DMRSs on the same OFDM symbol by using different sub-carriers (e.g., tones) for different DMRS ports. Using CDM, different DMRS ports can be used for transmission of DMRSs on the same OFDM symbol (or across a set of OFDM symbols on the same subcarrier) by using different orthogonal cover codes (OCCs) for different DMRS ports. The DMRS ports that are used for transmission on the same sub-carrier belong to the same CDM group, and the DMRS ports that are used for transmission on different sub-carriers belong to different CDM groups. In other words, a CDM group includes a set of DMRS ports used for transmission of a respective set of DMRSs on the same sub-carrier, where different OCCs are used for (e.g., to scramble) transmissions on different DMRS ports included in the set of DMRS ports.

The maximum number of CDM groups that are supported for one symbol may depend on a DMRS configuration for that symbol (or the resource block that includes the symbol). The DMRS configuration may dictate a maximum number of DMRS ports that can be used for DMRS transmission on a single symbol. As an example, and as shown by reference number 505, a first type of DMRS configuration (e.g., DMRS configuration type 1) may support a maximum of two CDM groups per symbol. In this configuration, a first CDM group (shown as CDM Group 0) may occupy a first set of subcarriers on a symbol, such as even subcarriers, and a second CDM group (shown as CDM Group 1) may occupy a second set of subcarriers on the symbol, such as odd subcarriers. As another example, and as shown by reference number 510, a second type of DMRS configuration (e.g., DMRS configuration type 2) may support a maximum of three CDM groups per symbol. In this configuration, a first CDM group (shown as CDM Group 0) may occupy a first set of subcarriers on a symbol (shown as subcarriers 0, 1, 6, and 7), a second CDM group (shown as CDM Group 1) may occupy a second set of subcarriers on the symbol (shown as subcarriers 2, 3, 8, and 9), and a third CDM group (shown as CDM Group 2) may occupy a third set of subcarriers on the symbol (shown as subcarriers 4, 5, 10, and 11). Additional details of CDM groups are described below in connection with FIG. 6 and FIG. 7.

As indicated above, FIG. 5 is provided as an example. Other examples may differ from what is described with respect to FIG. 5.

Figure 6:

FIG. 6 is a diagram illustrating an example 600 of CDM groups, in accordance with various aspects of the present disclosure. As described above in connection with reference number 505 of FIG. 5, a first type of DMRS configuration (e.g., DMRS configuration type 1) may support a maximum of two CDM groups per symbol. In this configuration, a first CDM group (CDM Group 0) may occupy a first set of subcarriers on a symbol, such as even subcarriers, and a second CDM group (CDM Group 1) may occupy a second set of subcarriers on the symbol, such as odd subcarriers.

As shown by reference number 605, in some aspects, a DMRS configuration that indicates the first type of DMRS configuration may also indicate that DMRSs are transmitted on one OFDM symbol (shown as symbol 2). In this case, the first CDM group, which occupies even subcarriers in this example, includes DMRS port 1000 and DMRS port 1001, and the second CDM group, which occupies odd subcarriers in this example, includes DMRS port 1002 and DMRS port 1003. The + and − characters shown in the figures represent an OCC applied to a DMRS transmission or a DMRS sequence in a particular resource element, where an OCC represented by a + character is different from an OCC represented by a − character. A DMRS port may sometimes be referred to by one or more least significant bits of the DMRS port identifier. For example, DMRS port 1000 may be referred to as DMRS port 0, DMRS port 1001 may be referred to as DMRS port 1, DMRS port 1002 may be referred to as DMRS port 2, DMRS port 1003 may be referred to as DMRS port 3, DMRS port 1010 may be referred to as DMRS port 10, DMRS port 1011 may be referred to as DMRS port 11, and so on.

As shown by reference number 610, in some aspects, a DMRS configuration that indicates the first type of DMRS configuration may also indicate that DMRSs are transmitted on two OFDM symbols (shown as symbols 2 and 3). In this case, the first CDM group, which occupies even subcarriers in this example, includes DMRS port 1000, DMRS port 1001, DMRS port 1004, and DMRS port 1005. Furthermore, the second CDM group, which occupies odd subcarriers in this example, includes DMRS port 1002, DMRS port 1003, DMRS port 1006, and DMRS port 1007.

As indicated above, FIG. 6 is provided as an example. Other examples may differ from what is described with respect to FIG. 6.

Figure 7:
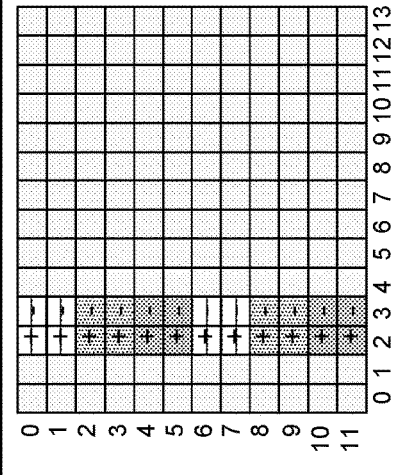
Figure 7:
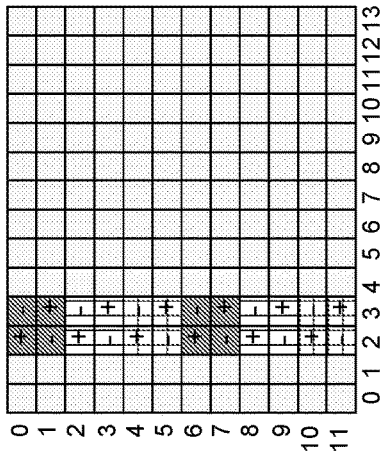
Figure 7:
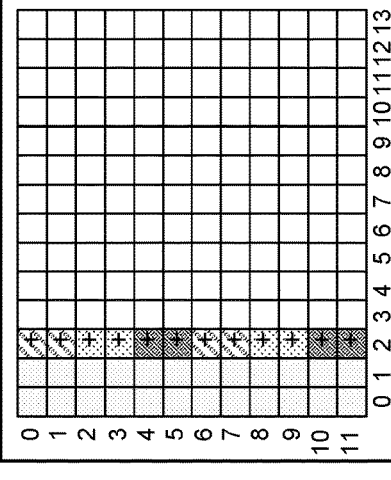
Figure 7:
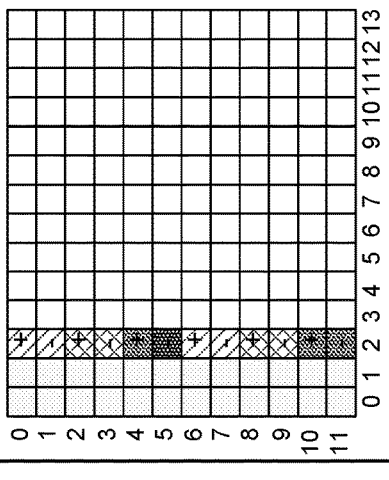

FIG. 7 is a diagram illustrating an example 700 of CDM groups, in accordance with various aspects of the present disclosure. As described above in connection with reference number 510 of FIG. 5, a second type of DMRS configuration (e.g., DMRS configuration type 2) may support a maximum of three CDM groups per symbol. In this configuration, a first CDM group (CDM Group 0) may occupy a first set of subcarriers on a symbol (shown as subcarriers 0, 1, 6, and 7), a second CDM group (CDM Group 1) may occupy a second set of subcarriers on the symbol (shown as subcarriers 2, 3, 8, and 9), and a third CDM group (CDM Group 2) may occupy a third set of subcarriers on the symbol (shown as subcarriers 4, 5, 10, and 11).

As shown by reference number 705, in some aspects, a DMRS configuration that indicates the second type of DMRS configuration may also indicate that DMRSs are transmitted on one OFDM symbol (shown as symbol 2). In this case, the first CDM group includes DMRS port 1000 and DMRS port 1001, the second CDM group includes DMRS port 1002 and DMRS port 1003, and the third CDM group includes DMRS port 1004 and DMRS port 1005.

As shown by reference number 710, in some aspects, a DMRS configuration that indicates the second type of DMRS configuration may also indicate that DMRSs are transmitted on two OFDM symbols (shown as symbols 2 and 3). In this case, the first CDM group includes DMRS port 1000, DMRS port 1001, DMRS port 1006, and DMRS port 1007, the second CDM group includes DMRS port 1002, DMRS port 1003, DMRS port 1008, and DMRS port 1009, and the third CDM group includes DMRS port 1004, DMRS port 1005, DMRS port 1010, and DMRS port 1011.

For wireless communication in a sub-6 GHz frequency band, such as frequency range 1 (FR1), and in a millimeter wave band, such as FR2, the DMRS design described in connection with FIGS. 5-7 may permit relatively accurate channel estimation and/or interpolation for subcarriers on which DMRSs are not received. For example, a UE that receives DMRS transmissions on port 0 in even subcarriers for the first type of DMRS configuration may be able to use DMRS measurements to estimate and/or interpolate a channel on odd subcarriers despite not receiving DMRS transmissions on the odd subcarriers. Similarly, a UE that receives DMRS transmissions on port 0 in subcarriers 0, 1, 6, and 7 for the second type of DMRS configuration may be able to use DMRS measurements to estimate and/or interpolate a channel on subcarriers 2 through 5 and 8 through 11 despite not receiving DMRS transmissions on those subcarriers.

However, for wireless communication in higher frequency bands (e.g., greater than 52.6 GHz, up to 71 GHz, and/or the like), a larger subcarrier spacing (e.g., 960 kHz, 1.92 MHz, 3.84 MHz, and/or the like) may be used as compared to lower frequency bands (such as FR1 and FR2, which may use a subcarrier spacing of 15 kHz, 30 kHz, 60 kHz, 120 kHz, 240 kHz, and/or the like), with the same Fast Fourier transform (FFT) size as the lower frequency bands. The larger subcarrier spacing may mitigate the impact of phase noise in the higher frequency bands and may support a larger bandwidth, such as 2 GHz, with a reasonable FFT size. However, with a larger subcarrier spacing, the DMRS design described in connection with FIGS. 5-7 may not permit accurate channel estimation and/or interpolation for subcarriers on which DMRSs are not received, because the spacing between subcarriers (e.g., a coherence bandwidth) is larger and thus more difficult to accurately estimate and/or interpolate across subcarriers. Some techniques and apparatuses described herein enable more accurate channel estimation and/or interpolation for this larger subcarrier spacing.

As indicated above, FIG. 7 is provided as an example. Other examples may differ from what is described with respect to FIG. 7.

Figure 8:
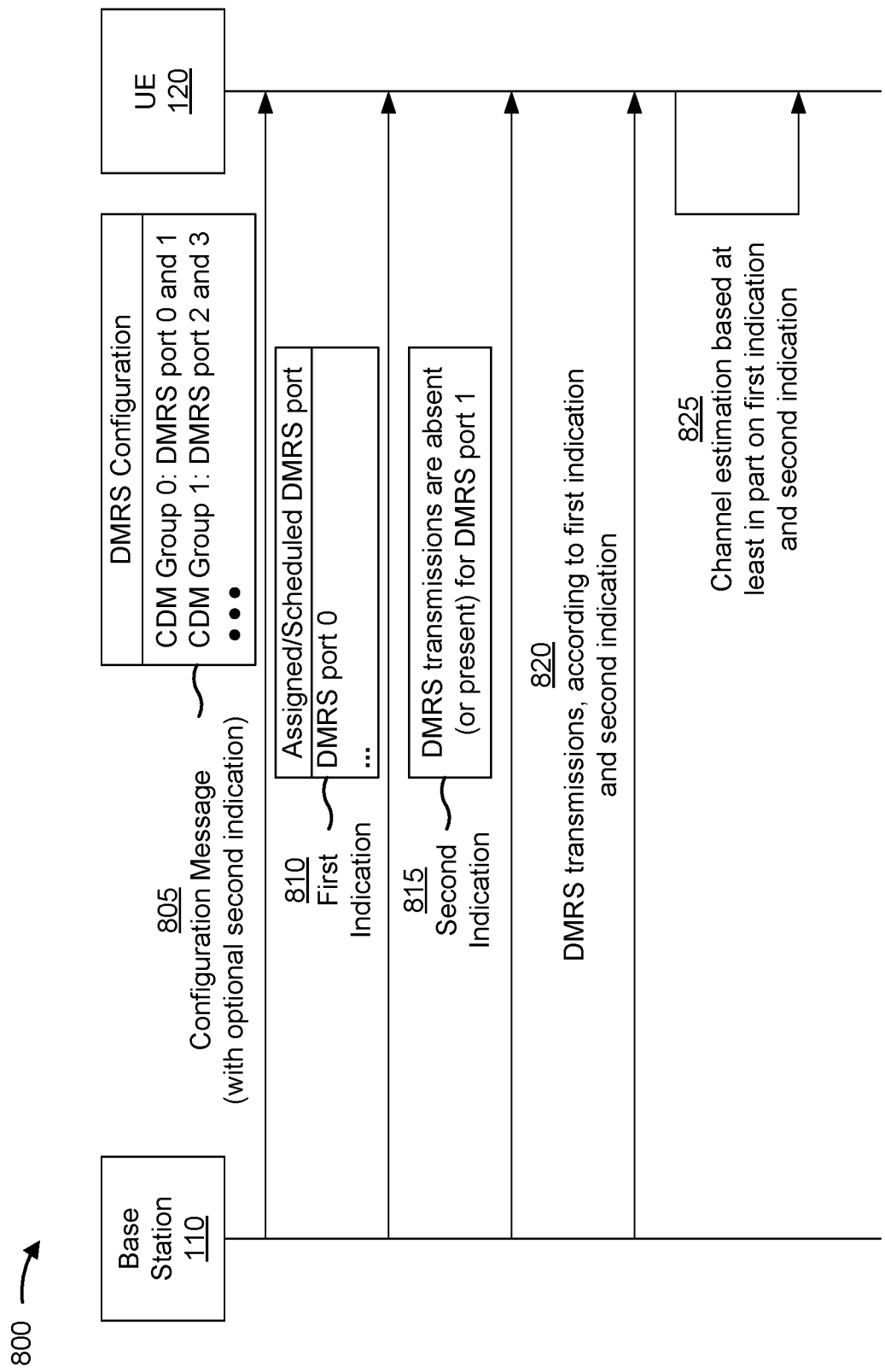

FIG. 8 is a diagram illustrating an example 800 associated with DMRS design for large sub-carrier spacing, in accordance with various aspects of the present disclosure. As shown in FIG. 8, a base station 110 and a UE 120 may communicate with one another.

As shown by reference number 805, the base station 110 may transmit a DMRS configuration to the UE 120. The DMRS configuration may be included in a configuration message, such as a radio resource control (RRC) message. As shown, the DMRS configuration may indicate one or more CDM groups configured for the UE 120, and corresponding DMRS ports included in each CDM group. In example 800, the DMRS configuration indicates a first CDM group (CDM group 0) that includes DMRS port 0 and DMRS port 1, and also indicates a second CDM group (CDM group 1) that includes DMRS port 2 and DMRS port 3.

As shown by reference number 810, the base station 110 may transmit, to the UE 120, an indication (e.g., a first indication) of an antenna port, included in the CDM group, assigned to the UE 120 for reception of a first set of DMRS transmissions. This antenna port (e.g., a DMRS port) may be referred to as an assigned DMRS port, a scheduled DMRS port, and/or the like. The UE 120 may use the indicated port for reception of DMRS transmissions that are transmitted by the base station 110. As shown, the DMRS port may be included in one of the CDM groups configured for the UE 120. In example 800, the assigned DMRS port is DMRS port 0, which is included in CDM group 0 and includes a single multiple input multiple output (MIMO) layer.

In some aspects, the indicated port for reception of DMRS transmissions may be assigned to the UE 120 for one or more resource blocks (RBs). For example, the indicated DMRS port may be used for reception of DMRS transmissions in a set of RBs that are included in a resource allocation scheduled for the UE 120 (e.g., for one or more physical downlink shared channel (PDSCH) communications). In some aspects, the DMRS port, the set of RBs, the resource allocation, and/or the like may be indicated in downlink control information (DCI).

As shown by reference number 815, the base station 110 may transmit, to the UE 120, an indication (e.g., a second indication) of whether a second set of DMRS transmissions for another antenna port, included in the CDM group, is present or absent for another UE 120 (e.g., different from the UE 120 shown in FIG. 8). In example 800, DMRS port 0 and DMRS port 1 are included in CDM group 0, DMRS port 0 is assigned to the UE 120, and the second indication indicates that DMRS transmissions are absent on DMRS port 1 (which is included in the same CDM group as DMRS port 0). In some aspects, the second indication may be included in a configuration message (e.g., an RRC message), in DCI, in activation DCI, in a medium access control (MAC) control element (MAC-CE), and/or the like. In some aspects, the techniques and operations described herein in connection with FIGS. 8-11 may be used for single-layer communications (e.g., using a single port for DMRS transmissions from the base station 110 to the UE 120).

In some aspects, the second indication may be included in DCI. In some aspects, the first indication and the second indication may be included in the same message, such as the same DCI message. In some aspects, the first indication and the second indication are indicated using a same field in the DCI. In some aspects, the first indication and the second indication are indicated using a single value in the DCI (e.g., an index value). In some aspects, a single value in the DCI indicates a number of CDM groups without data, the antenna port assigned to the UE 120, and whether the second set of DMRS transmissions for the other antenna port is present or absent for another UE 120. In some aspects, a first field in the DCI includes the first indication, and a second field in the DCI includes the second indication. In some aspects, the second field consists of a single bit. In some cases, including the second indication in a DCI message may provide greater scheduling flexibility for the base station 110 as compared to signaling the second indication in an RRC message. Additional details of these DCI-based aspects are described below in connection with FIG. 9 and FIG. 10.

In some aspects, the second indication may be included in a configuration message. In some aspects, the DMRS configuration and the second indication may be included in the same message, such as the same configuration message (e.g., the same RRC message). As used herein, an RRC message may include an RRC configuration message, an RRC reconfiguration message, and/or the like. In some cases, including the second indication in an RRC message may conserve signaling overhead as compared to signaling the second indication in multiple, different DCI messages over time. In some aspects, a DMRS table (e.g., a DMRS antenna port table), indicated in the DMRS configuration, that includes at least one of the first indication or the second indication is different for the UE 120 as compared to another UE 120, as described in more detail below in connection with FIG. 11.

In some aspects, the second indication may be based at least in part on a modulation and coding scheme (MCS) signaled by the base station 110 to the UE 120 in association with the first indication of the antenna port assigned to the UE 120. For example, DCI that indicates the DMRS port assigned to the UE 120 may also indicate an MCS to be used for a communication (e.g., a data communication, such as a PDSCH communication) scheduled by the DCI (and for which the channel estimation using the DMRSs is performed). The MCS (e.g., an MCS index value, a modulation scheme, a coding scheme, and/or the like) may dictate whether DMRS transmissions on non-assigned DMRS ports from the same CDM group as the assigned DMRS port (e.g., non-assigned DMRS port 1 in example 800) are present or absent.

For example, if an MCS index signaled to the UE 120 satisfies a threshold (e.g., is greater than a threshold, is greater than or equal to a threshold, and/or the like), then the UE 120 may determine that DMRS transmissions on the non-assigned DMRS ports, from the same CDM group as the assigned DMRS port, are absent because the performance of higher MCSs is more sensitive to channel estimation errors. As another example, if an MCS index signaled to the UE 120 does not satisfy the threshold (e.g., is less than the threshold, is less than or equal to the threshold, and/or the like), then the UE 120 may determine that DMRS transmissions on the non-assigned DMRS ports, from the same CDM group as the assigned DMRS port, are present (e.g., for single layer MIMO) because the performance of lower MCSs is less sensitive to channel estimation errors. For multi-layer MIMO, if the UE 120 is scheduled with two codewords, the UE 120 may assume that all remaining orthogonal antenna ports are not associated with transmission of PDSCH to another UE, and thus may assume that DMRS transmissions on the non-assigned DMRS ports, from the same CDM group as the assigned DMRS port, are absent.

Additionally, or alternatively, the second indication may be based at least in part on a subcarrier spacing and/or an estimated delay spread associated with the UE 120 and the base station 110. For example, the second indication may be based at least in part on a subcarrier spacing configured and/or used for communications between the UE 120 and the base station. In some aspects, the subcarrier spacing and/or the estimated delay spread may dictate whether DMRS transmissions on non-assigned DMRS ports from the same CDM group as the assigned DMRS port (e.g., non-assigned DMRS port 1 in example 800) are present or absent, similar to the MCS example described above.

For example, if the subcarrier spacing and/or the estimated delay spread satisfies a threshold (e.g., is greater than a threshold, is greater than or equal to a threshold, and/or the like), then the UE 120 may determine that DMRS transmissions on the non-assigned DMRS ports, from the same CDM group as the assigned DMRS port, are absent because communications with a large subcarrier spacing and a large delay spread are more sensitive to channel estimation errors. As another example, if the subcarrier spacing and/or the estimated delay spread does not satisfy the threshold (e.g., is less than the threshold, is less than or equal to the threshold, and/or the like), then the UE 120 may determine that DMRS transmissions on the non-assigned DMRS ports, from the same CDM group as the assigned DMRS port, are present (e.g., for single layer MIMO) because communications with a small subcarrier spacing and a small delay spread are less sensitive to channel estimation errors. For multi-layer MIMO, if the UE 120 is scheduled with two codewords, the UE 120 may assume that all remaining orthogonal antenna ports are not associated with transmission of PDSCH to another UE, and thus may assume that DMRS transmissions on the non-assigned DMRS ports, from the same CDM group as the assigned DMRS port, are absent.

In some aspects, the UE 120 may determine whether DMRS transmissions are present or absent based at least in part on whether an MCS satisfies a first threshold, whether a subcarrier spacing satisfies a second threshold, and/or whether an estimated delay spread satisfies a third threshold. In some aspects, the base station 110 may indicate one or more of these thresholds (e.g., the first threshold, the second threshold, and/or the third threshold, such as an MCS threshold, a subcarrier spacing threshold, and/or a delay spread threshold) to the UE 120, such as in a configuration message, a MAC-CE, and/or the like. In some aspects, one or more of these thresholds may be specified in a wireless communication standard.

As shown by reference number 820, the base station 110 may transmit DMRSs according to the first indication and the second indication. For example, if the second indication indicates that DMRS transmissions are present on DMRS port 1, then the base station 110 may transmit a first set of DMRS transmissions to the UE 120 on DMRS port 0, and may transmit a second set of DMRS transmissions to another UE 120 on DMRS port 1. Alternatively, if the second indication indicates that DMRS transmissions are absent on DMRS port 1, then the base station 110 may transmit a first set of DMRS transmissions to the UE 120 on DMRS port 0, and may refrain from transmitting a second set of DMRS transmissions to another UE 120 on DMRS port 1.

As shown by reference number 825, the UE 120 may perform channel estimation based at least in part on the first indication and the second indication. For example, if the second indication indicates that DMRS transmissions are present on DMRS port 1, then UE 120 may receive the first set of DMRS transmissions on DMRS port 0 (e.g., as indicated by the first indication), and may perform channel estimation using an OCC (sometimes referred to as de-CDMing). In this case, the UE 120 may multiply the received DMRS sequence on DMRS port 0 by an associated OCC to obtain the intended DMRS sequence, and may then perform DMRS processing on the intended DMRS sequence. Alternatively, if the second indication indicates that DMRS transmissions are absent on DMRS port 1, then the UE 120 may receive the first set of DMRS transmissions on DMRS port 0 (e.g., as indicated by the first indication), and may perform channel estimation without using an OCC (e.g., without performing de-CDMing). In this case, the UE 120 may perform DMRS processing directly on the received DMRS sequence without multiplying the received DMRS sequence by an associated OCC, thereby conserving resources of the UE 120 (e.g., processing resources, memory resources, battery power, and/or the like).

As indicated above, FIG. 8 is provided as an example. Other examples may differ from what is described with respect to FIG. 8.

FIG. 9 is a diagram illustrating an example 900 associated with DMRS design for large sub-carrier spacing, in accordance with various aspects of the present disclosure. As described above in connection with FIG. 8, a base station 110 may indicate whether a second set of DMRS transmissions, for a DMRS port that is not assigned to a UE 120 and that is included in the same CDM group as a DMRS port assigned to the UE 120 for a first set of DMRS transmissions, is present or absent for another UE 120. In some aspects, this indication may be included in DCI.

As shown in FIG. 9, in some aspects, a single value in DCI (shown as "Value") indicates a number of DMRS CDM groups without data and the one or more DMRS ports assigned to the UE 120. As shown by reference number 905, in some aspects, the single value may indicate a number of DMRS CDM groups without data, the one or more DMRS ports assigned to the UE 120, and whether the second set of DMRS transmissions for the one or more other DMRS ports (included in the same CDM group as the assigned DMRS port(s)) is present or absent for another UE 120. In some aspects, one or more reserved bits of DCI (e.g., having a legacy DCI format) may be used for this indication. By using a single value to indicate multiple parameters, signaling overhead may be conserved. In some aspects, the table shown in FIG. 9 (or a similar table that indicates the values described in connection with FIG. 9) may be indicated to the UE 120 by the base station 110, such as in a configuration message.

As indicated above, FIG. 9 is provided as an example. Other examples may differ from what is described with respect to FIG. 9.

FIG. 10 is a diagram illustrating an example 1000 associated with DMRS design for large sub-carrier spacing, in accordance with various aspects of the present disclosure. As described above in connection with FIG. 8, a base station 110 may indicate whether a second set of DMRS transmissions, for a DMRS port that is not assigned to a UE 120 and that is included in the same CDM group as a DMRS port assigned to the UE 120 for a first set of DMRS transmissions, is present or absent for another UE 120. In some aspects, this indication may be included in DCI.

As shown in FIG. 10, in some aspects, a single value in DCI (shown as "Value") indicates a number of DMRS CDM groups without data, the one or more DMRS ports assigned to the UE 120, and a number of front-loaded symbols (e.g., for DMRS). As shown by reference number 1005, in some aspects, the single value may indicate a number of DMRS CDM groups without data, the one or more DMRS ports assigned to the UE 120, the number of front-loaded symbols, and whether the second set of DMRS transmissions for the one or more other DMRS ports (included in the same CDM group as the assigned DMRS port(s)) is present or absent for another UE 120.

In some aspects, a DCI field (e.g., of DCI having a legacy DCI format) may be expanded to have a larger bit length to support this indication. By using a single value to indicate multiple parameters, signaling overhead may be conserved. Alternatively, rather than expanding a number of bits of this DCI field, a first field in the DCI may indicate a number of DMRS CDM groups without data, the one or more DMRS ports assigned to the UE 120, and/or a number of front-loaded symbols, and a second field in the DCI may indicate whether DMRS transmissions are present or absent for non-assigned DMRS ports in the same CDM group as the assigned DMRS port. In some aspects, the second field consists of a single bit. In some aspects, the table shown in FIG. 10 (or a similar table that indicates the values described in connection with FIG. 10) may be indicated to the UE 120 by the base station 110, such as in a configuration message.

As indicated above, FIG. 10 is provided as an example. Other examples may differ from what is described with respect to FIG. 10.

FIG. 11 is a diagram illustrating an example 1100 associated with DMRS design for large sub-carrier spacing, in accordance with various aspects of the present disclosure. As shown in FIG. 11, a DMRS table (e.g., a DMRS antenna port table) may include a set of values (shown as entries in a "Value" column). Each value, of the set of values, may indicate a number of DMRS CDM groups without data, one or more DMRS ports assigned to a UE 120, a number of front-loaded symbols, and/or whether DMRS transmissions are present or absent for non-assigned DMRS ports in the same CDM group as the assigned DMRS port. When a DMRS table (e.g., any DMRS table shown or described in connection with FIGS. 8-11) is configured for a UE 120, the UE 120 may refer to the DMRS table to determine one or more parameters corresponding to a value signaled to the UE 120. For example, the value may be signaled in DCI, and the UE 120 may use the value to look up a corresponding entry in the DMRS table.

As shown in FIG. 11, in some aspects, a DMRS table 1105 (e.g., a first DMRS table), configured for a first UE 120, may be different from a DMRS table 1110 (e.g., a second DMRS table) configured for a second UE 120. In example 1100, a value of 0 in DMRS table 1105 for UE 0 indicates that DMRS port 0 is assigned to UE 0 and that DMRS transmissions are present on DMRS port 1 (e.g., in the same CDM group as DMRS port 0), and a value of 1 in DMRS table 1105 for UE 0 indicates that DMRS port 0 is assigned to UE 0 and that DMRS transmissions are absent on DMRS port 1. However, a value of 0 in DMRS table 1110 for UE 1 indicates that DMRS port 1 is assigned to UE 1 and that DMRS transmissions are present on DMRS port 0 (e.g., in the same CDM group as DMRS port 1), and a value of 1 in DMRS table 1110 for UE 1 indicates that DMRS port 1 is assigned to UE 1 and that DMRS transmissions are absent on DMRS port 0. In this way, a size of DCI may be reduced or maintained (e.g., by avoiding addition of DCI bits) while providing increased scheduling flexibility for the base station 110.

As indicated above, FIG. 11 is provided as an example. Other examples may differ from what is described with respect to FIG. 11.

Figure 12:
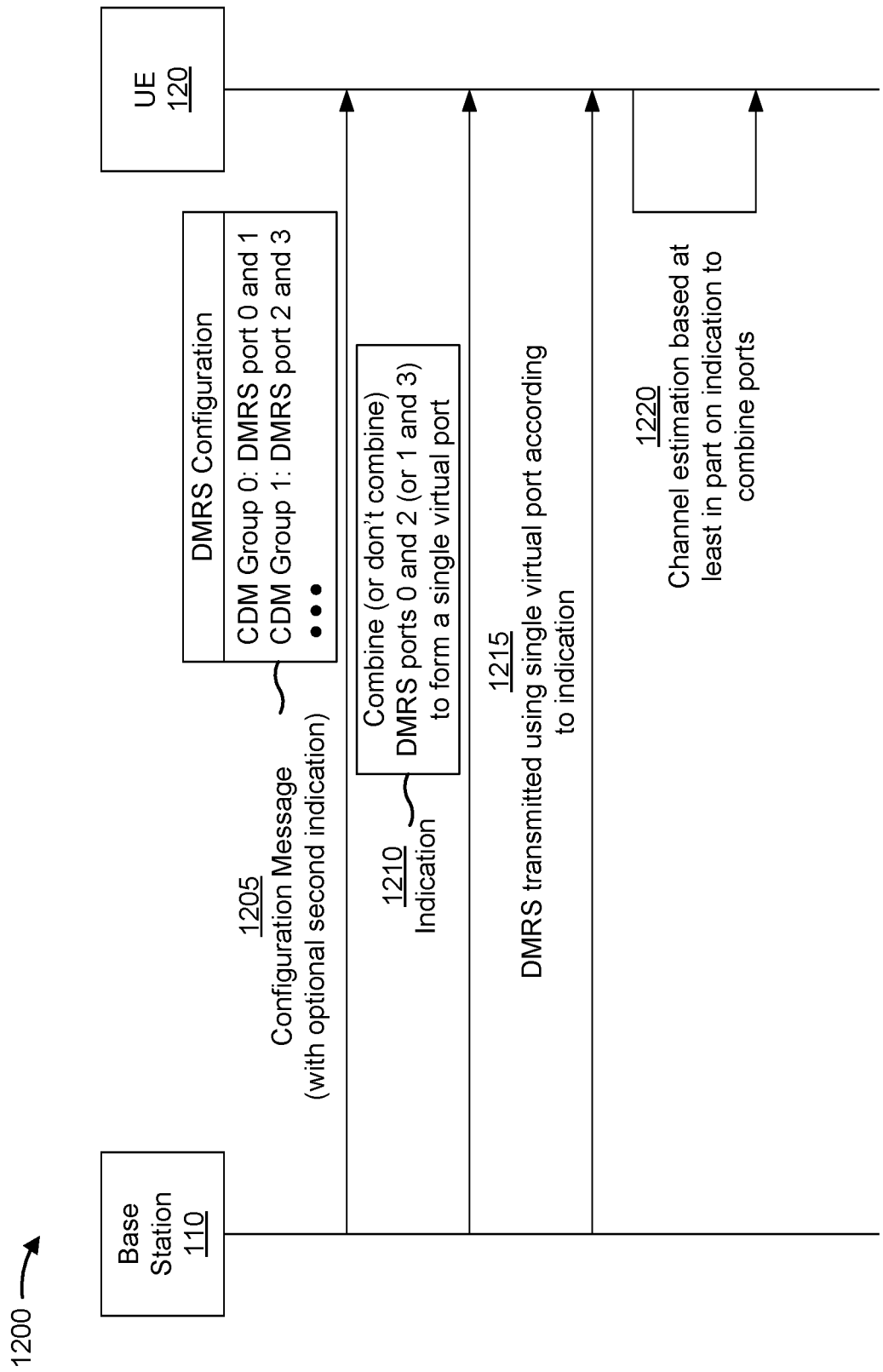

FIG. 12 is a diagram illustrating an example 1200 associated with DMRS design for large sub-carrier spacing, in accordance with various aspects of the present disclosure. As shown in FIG. 12, a base station 110 and a UE 120 may communicate with one another.

As shown by reference number 1205, the base station 110 may transmit a DMRS configuration to the UE 120. The DMRS configuration may be included in a configuration message, such as an RRC message. As shown, the DMRS configuration may indicate multiple CDM groups configured for the UE 120, and corresponding DMRS ports included in each CDM group. In example 1200, the DMRS configuration indicates a first CDM group (CDM group 0) that includes DMRS port 0 and DMRS port 1, and also indicates a second CDM group (CDM group 1) that includes DMRS port 2 and DMRS port 3.

As shown by reference number 1210, the base station 110 may transmit, to the UE 120, an indication of whether to combine a first antenna port (e.g., a first DMRS port), included in the first CDM group, and a second antenna port (e.g., a second DMRS port), included in the second CDM group, into a single virtual port for DMRS transmissions. In example 1200, the indication indicates whether to combine DMRS port 0 (from CDM group 0) and DMRS port 2 (from CDM group 1) into a single virtual port. As another example, the indication may indicate whether to combine DMRS port 1 (from CDM group 0) and DMRS port 3 (from CDM group 1) into a single virtual port. Details of combining multiple ports into a single virtual port are described above in connection with FIG. 4. In some aspects, the indication may be included in a configuration message (e.g., an RRC message), in DCI, in activation DCI, in a MAC-CE, and/or the like.

In some aspects, the indication of whether to combine DMRS ports and/or which DMRS ports to combine may be indicated to the UE 120 for one or more resource blocks (RBs). For example, the indicated DMRS ports (e.g., combined into a single virtual port) may be used for reception of DMRS transmissions in a set of RBs that are included in a resource allocation scheduled for the UE 120 (e.g., for one or more PDSCH communications). In some aspects, the DMRS ports, the indication of whether to combine DMRS ports, the set of RBs, the resource allocation, and/or the like may be indicated in DCI.

In some aspects, the indication may be included in DCI. In some aspects, the first DMRS port, the second DMRS port, and the indication of whether to combine the first DMRS port and the second DMRS port are indicated using a same field in the DCI. In some aspects, the first DMRS port, the second DMRS port, and the indication of whether to combine the first DMRS port and the second DMRS port are indicated using a single value in the DCI (e.g., an index value). In some aspects, a single value in the DCI indicates a number of CDM groups without data, the first DMRS port, the second DMRS port, and whether to combine the first DMRS port and the second DMRS port into a single virtual port. In some aspects, a first field in the DCI indicates the first DMRS port and the second DMRS port, and a second field in the DCI indicates whether to combine the first DMRS port and the second DMRS port into a single virtual port. In some aspects, the second field consists of a single bit. In some cases, including the indication in a DCI message may provide greater scheduling flexibility for the base station 110 as compared to signaling the indication in an RRC message. Additional details of these DCI-based aspects are described below in connection with FIG. 13 and FIG. 14.

In some aspects, the indication may be included in a configuration message. In some aspects, the DMRS configuration and the indication may be included in the same message, such as the same configuration message (e.g., the same RRC message). In some cases, including the indication in an RRC message may conserve signaling overhead as compared to signaling the indication in multiple, different DCI messages over time. In some aspects, a DMRS table (e.g., a DMRS antenna port table), indicated in the DMRS configuration, that includes at least one of the indications is different for the UE 120 as compared to another UE 120, as described in more detail below in connection with FIG. 15.

In some aspects, the indication may be based at least in part on an MCS signaled by the base station 110 to the UE 120 (e.g., in DCI). For example, DCI that indicates one or more DMRS ports assigned to the UE 120 may also indicate an MCS to be used for a communication (e.g., a data communication, such as a PDSCH communication) scheduled by the DCI (and for which the channel estimation using the DMRSs is performed). The MCS (e.g., an MCS index value, a modulation scheme, a coding scheme, and/or the like) may dictate whether the assigned one or more DMRS ports (e.g., DMRS port 0 and DMRS port 2 in example 1200) are to be combined into a single virtual port. In some aspects, the DCI may indicate multiple DMRS ports assigned to the UE 120, and the UE 120 may use the MCS to determine whether to combine the multiple DMRS ports into a single virtual port. Alternatively, the DCI may indicate a single DMRS port assigned to the UE 120, and the UE 120 may use the MCS to determine whether to combine the indicated DMRS port with another (non-indicated) DMRS port from another CDM group into a single virtual port. In some aspects, the UE 120 may be configured with a set of DMRS ports that are to be combined depending on the MCS.

In some aspects, for single layer MIMO, if the UE 120 is assigned two DMRS ports, then the UE 120 may combine the two DMRS ports into a single virtual port based at least in part on determining that the two DMRS ports are assigned for single layer MIMO. In this case, the indication to combine ports may be implicit.

For example, if an MCS index signaled to the UE 120 satisfies a threshold (e.g., is greater than a threshold, is greater than or equal to a threshold, and/or the like), then the UE 120 may determine that the DMRS ports are to be combined, because the performance of higher MCSs is more sensitive to channel estimation errors. As another example, if an MCS index signaled to the UE 120 does not satisfy the threshold (e.g., is less than the threshold, is less than or equal to the threshold, and/or the like), then the UE 120 may determine that the DMRS ports are not to be combined, because the performance of lower MCSs is less sensitive to channel estimation errors.

Additionally, or alternatively, the indication may be based at least in part on a subcarrier spacing and/or an estimated delay spread associated with the UE 120 and the base station 110. For example, the indication may be based at least in part on a subcarrier spacing configured and/or used for communications between the UE 120 and the base station. In some aspects, the subcarrier spacing and/or the estimated delay spread may dictate whether the assigned one or more DMRS ports (e.g., DMRS port 0 and DMRS port 2 in example 1200) are to be combined into a single virtual port, similar to the MCS example described above. In some aspects, the DCI may indicate multiple DMRS ports assigned to the UE 120, and the UE 120 may use the subcarrier spacing and/or the estimated delay spread to determine whether to combine the multiple DMRS ports into a single virtual port. Alternatively, the DCI may indicate a single DMRS port assigned to the UE 120, and the UE 120 may use the subcarrier spacing and/or the estimated delay spread to determine whether to combine the indicated DMRS port with another (non-indicated) DMRS port from another CDM group into a single virtual port. In some aspects, the UE 120 may be configured with a set of DMRS ports that are to be combined depending on the subcarrier spacing and/or the estimated delay spread.

For example, if the subcarrier spacing and/or the estimated delay spread satisfies a threshold (e.g., is greater than a threshold, is greater than or equal to a threshold, and/or the like), then the UE 120 may determine that the DMRS ports are to be combined, because communications with a large subcarrier spacing and a large delay spread are more sensitive to channel estimation errors. As another example, if the subcarrier spacing and/or the estimated delay spread does not satisfy the threshold (e.g., is less than the threshold, is less than or equal to the threshold, and/or the like), then the UE 120 may determine that the DMRS ports are not to be combined, because communications with a small subcarrier spacing and a small delay spread are less sensitive to channel estimation errors.

In some aspects, the UE 120 may determine whether the assigned DMRS ports are to be combined based at least in part on whether an MCS satisfies a first threshold, whether a subcarrier spacing satisfies a second threshold, and/or whether an estimated delay spread satisfies a third threshold. In some aspects, the base station 110 may indicate one or more of these thresholds (e.g., the first threshold, the second threshold, and/or the third threshold, such as an MCS threshold, a subcarrier spacing threshold, and/or a delay spread threshold) to the UE 120, such as in a configuration message, a MAC-CE, and/or the like. In some aspects, one or more of these thresholds may be specified in a wireless communication standard.

As shown by reference number 1215, the base station 110 may transmit DMRSs according to the indication. For example, if the indication indicates that DMRS ports are not to be combined, then the base station 110 may transmit a first set of DMRS transmissions to the UE 120 using a DMRS port assigned to the UE 120 (e.g., as indicated in DCI). In some aspects, the base station 110 may also transmit a second set of DMRS transmissions to another UE 120 using a DMRS port that is not assigned to the UE 120 and that is in the same CDM group as the DMRS port assigned to the UE 120. Alternatively, if the indication indicates that DMRS ports are to be combined, then the base station 110 may transmit a set of DMRS transmissions to the UE 120 using the single virtual port (e.g., which may be indicated and/or assigned to the UE 120 in DCI). In some aspects, the set of DMRS transmissions on the single virtual port are contained within a single symbol. In some aspects, the set of DMRS transmissions on the single virtual port span multiple symbols, as described in more detail below in connection with FIG. 16 and FIG. 17.

As shown by reference number 1220, the UE 120 may perform channel estimation based at least in part on the indication. For example, if the indication indicates that DMRS ports are not to be combined, then the UE 120 may receive a first set of DMRS transmissions using a DMRS port assigned to the UE 120 (e.g., as indicated in DCI), and may perform channel estimation using the first set of DMRS transmissions. In some aspects, the UE 120 may perform channel estimation using the first set of DMRS transmissions by de-CDMing the first set of DMRS transmissions (as described elsewhere herein) and/or by performing frequency domain interpolation for one or more resource elements (or subcarriers) on which the first set of DMRS transmissions are not received. Alternatively, if the indication indicates that DMRS ports are to be combined, then the UE 120 may receive a set of DMRS transmissions on the single virtual port, and may perform channel estimation using the set of DMRS transmissions. In some aspects, the UE 120 may perform channel estimation using the set of DMRS transmissions without de-CDMing the set of DMRS transmissions and/or without performing frequency domain interpolation (e.g., because the set of DMRS transmissions on the single virtual port covers all resource elements and subcarriers in a resource block). In this way, a full density DMRS pattern may be enabled, which may improve the accuracy of channel estimation.

In some aspects, a third type of DMRS configuration (e.g., DMRS configuration type 3) may be defined by a wireless communication standard and/or may be configured by the base station 110. The third type of DMRS configuration may use full frequency density DMRS transmissions. In this case, DMRS transmissions associated with a particular port may span all subcarriers within a resource block. The third type of DMRS configuration may be used with or without combining multiple DMRS ports into a single DMRS port. For example, the third type of DMRS configuration may define a single DMRS port that spans all subcarriers within a resource block. Alternatively, the third type of DMRS configuration may define multiple DMRS ports that can be combined into a single virtual port that spans all subcarriers within a resource block. In this way, a full density DMRS pattern may be enabled, which may improve the accuracy of channel estimation.

As indicated above, FIG. 12 is provided as an example. Other examples may differ from what is described with respect to FIG. 12.

FIG. 13 is a diagram illustrating an example 1300 associated with DMRS design for large sub-carrier spacing, in accordance with various aspects of the present disclosure. As described above in connection with FIG. 12, a base station 110 may indicate whether to combine two or more assigned DMRS ports into a single virtual port. In some aspects, this indication may be included in DCI.

As shown in FIG. 13, in some aspects, a single value in DCI (shown as "Value") indicates a number of DMRS CDM groups without data and one or more DMRS ports assigned to a UE 120. As shown by reference number 1305, in some aspects, the single value may indicate a number of DMRS CDM groups without data, the multiple DMRS ports assigned to the UE 120, and whether the multiple DMRS ports are to be combined into a single virtual port. In some aspects, one or more reserved bits of DCI (e.g., having a legacy DCI format) may be used for this indication. By using a single value to indicate multiple parameters, signaling overhead may be conserved. In some aspects, the table shown in FIG. 13 (or a similar table that indicates the values described in connection with FIG. 13) may be indicated to the UE 120 by the base station 110, such as in a configuration message.

As indicated above, FIG. 13 is provided as an example. Other examples may differ from what is described with respect to FIG. 13.

FIG. 14 is a diagram illustrating an example 1400 associated with DMRS design for large sub-carrier spacing, in accordance with various aspects of the present disclosure. As described above in connection with FIG. 12, a base station 110 may indicate whether to combine two or more assigned DMRS ports into a single virtual port. In some aspects, this indication may be included in DCI.

As shown in FIG. 14, in some aspects, a single value in DCI (shown as "Value") indicates a number of DMRS CDM groups without data, one or more DMRS ports assigned to a UE 120, and a number of front-loaded symbols (e.g., for DMRS). As shown by reference number 1405, in some aspects, the single value may indicate a number of DMRS CDM groups without data, multiple DMRS ports assigned to the UE 120, the number of front-loaded symbols, and whether the multiple DMRS ports are to be combined into a single virtual port.

In some aspects, a DCI field (e.g., of DCI having a legacy DCI format) may be expanded to have a larger bit length to support this indication. By using a single value to indicate multiple parameters, signaling overhead may be conserved. Alternatively, rather than expanding a number of bits of this DCI field, a first field in the DCI may indicate a number of DMRS CDM groups without data, the multiple DMRS ports assigned to the UE 120, and/or a number of front-loaded symbols, and a second field in the DCI may indicate whether the multiple DMRS ports are to be combined into a single virtual port. In some aspects, the second field consists of a single bit. In some aspects, the table shown in FIG. 14 (or a similar table that indicates the values described in connection with FIG. 14) may be indicated to the UE 120 by the base station 110, such as in a configuration message.

As indicated above, FIG. 14 is provided as an example. Other examples may differ from what is described with respect to FIG. 14.

FIG. 15 is a diagram illustrating an example 1500 associated with DMRS design for large sub-carrier spacing, in accordance with various aspects of the present disclosure. As shown in FIG. 15, a DMRS table (e.g., a DMRS antenna port table) may include a set of values (shown as entries in a "Value" column). Each value, of the set of values, may indicate a number of DMRS CDM groups without data, one or more DMRS ports assigned to a UE 120 (e.g., multiple DMRS ports assigned to the UE 120, in some aspects), a number of front-loaded symbols, and/or whether multiple assigned DMRS ports are to be combined into a single virtual port. When a DMRS table (e.g., any DMRS table shown or described in connection with FIGS. 12-15) is configured for a UE 120, the UE 120 may refer to the DMRS table to determine one or more parameters corresponding to a value signaled to the UE 120. For example, the value may be signaled in DCI, and the UE 120 may use the value to look up a corresponding entry in the DMRS table.

As shown in FIG. 15, in some aspects, a DMRS table 1505 (e.g., a first DMRS table), configured for a first UE 120, may be different from a DMRS table 1510 (e.g., a second DMRS table) configured for a second UE 120. In example 1500, a value of 0 in DMRS table 1505 for UE 0 indicates that DMRS port 0 and DMRS port 2 are assigned to UE 0 and that DMRS port 0 and DMRS port 2 are to be combined into a single virtual port. However, a value of 0 in DMRS table 1510 for UE 1 indicates that DMRS port 1 and DMRS port 3 are assigned to UE 1 and that DMRS port 1 and DMRS port 3 are to be combined into a single virtual port. In this way, a size of DCI may be reduced or maintained (e.g., by avoiding addition of DCI bits) while providing increased scheduling flexibility for the base station 110.

As indicated above, FIG. 15 is provided as an example. Other examples may differ from what is described with respect to FIG. 15.

Figure 16:
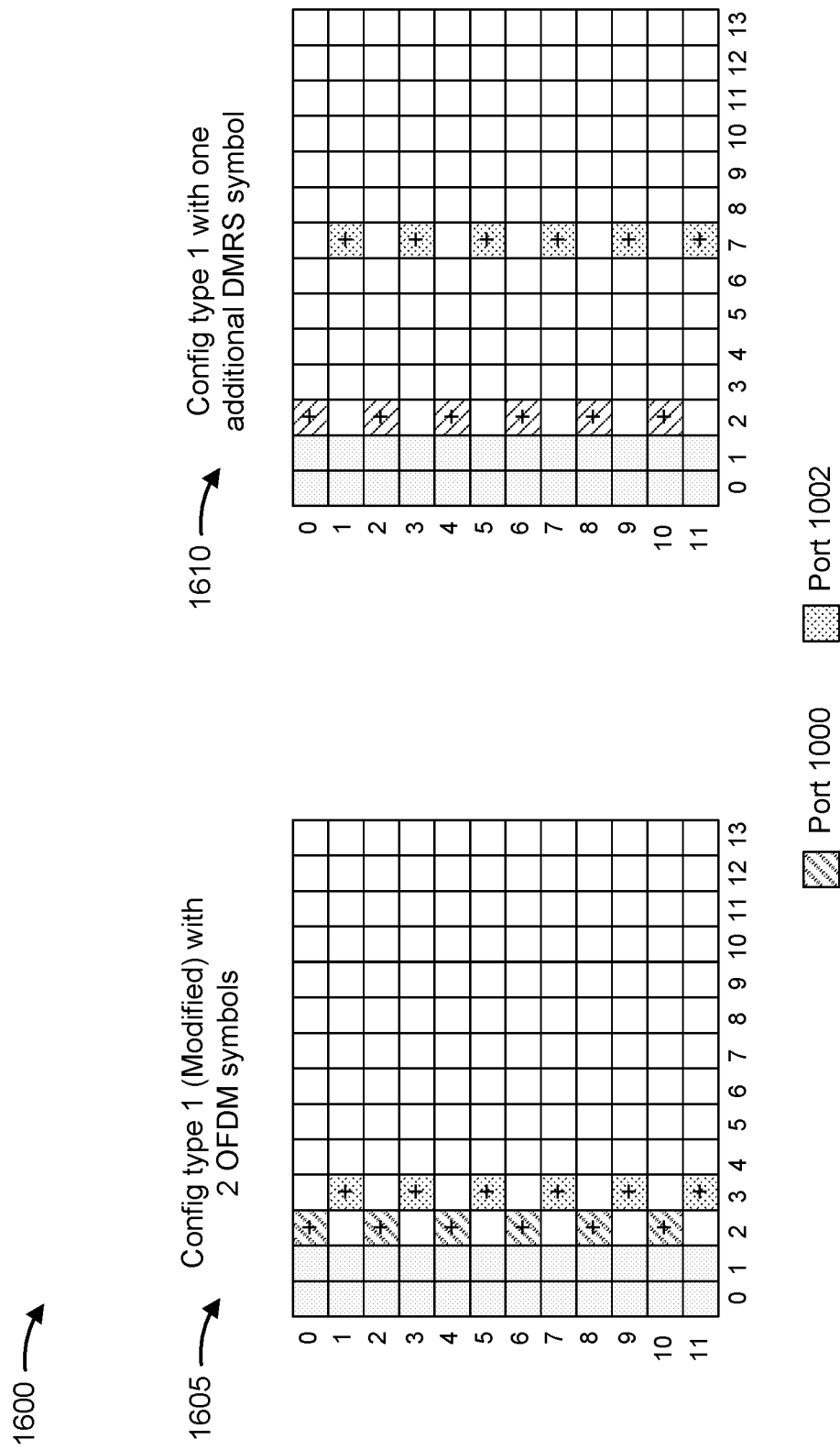

FIG. 16 is a diagram illustrating an example 1600 associated with DMRS design for large sub-carrier spacing, in accordance with various aspects of the present disclosure. As shown in FIG. 16, a modified first type of DMRS configuration may support a maximum of two CDM groups, with different CDM groups being used on different symbols. In this configuration, a first CDM group (CDM Group 0) may occupy a set or a subset of subcarriers on a first symbol, and a second CDM group (CDM Group 1) may occupy a set or a subset of subcarriers on a second symbol. The first CDM group may include multiple DMRS ports, such as DMRS port 0 (shown as Port 1000) and DMRS port 1, and the second CDM group may also include multiple DMRS ports, such as DMRS port 2 (shown as Port 1002) and DMRS port 3.

In some aspects, as shown by reference number 1605, this type of configuration may span two adjacent symbols. In this case, the first CDM group (CDM Group 0) may occupy a set or a subset of subcarriers on a first symbol (shown as even subcarriers on symbol 2), and a second CDM group (CDM Group 1) may occupy a set or a subset of subcarriers on a second symbol (shown as odd subcarriers on symbol 3).

Alternatively, as shown by reference number 1610, this type of configuration may span two non-adjacent symbols (e.g., a single symbol DMRS configuration with an additional configured DMRS symbol). In this case, the first CDM group (CDM Group 0) may occupy a set or a subset of subcarriers on a first symbol (shown as even subcarriers on symbol 2), and a second CDM group (CDM Group 1) may occupy a set or a subset of subcarriers on a second symbol (shown as odd subcarriers on symbol 7).

In some aspects, when this configuration is used, multiple DMRS ports may be combined into a single virtual port, as described elsewhere herein. In this way, denser DMRS coverage in the frequency domain may be achieved. Furthermore, multiple DMRS symbols, that use a legacy DMRS configuration, may be assigned with different DMRS ports. The multiple DMRS symbols can be consecutive or non-consecutive.

As indicated above, FIG. 16 is provided as an example. Other examples may differ from what is described with respect to FIG. 16.

Figure 17:
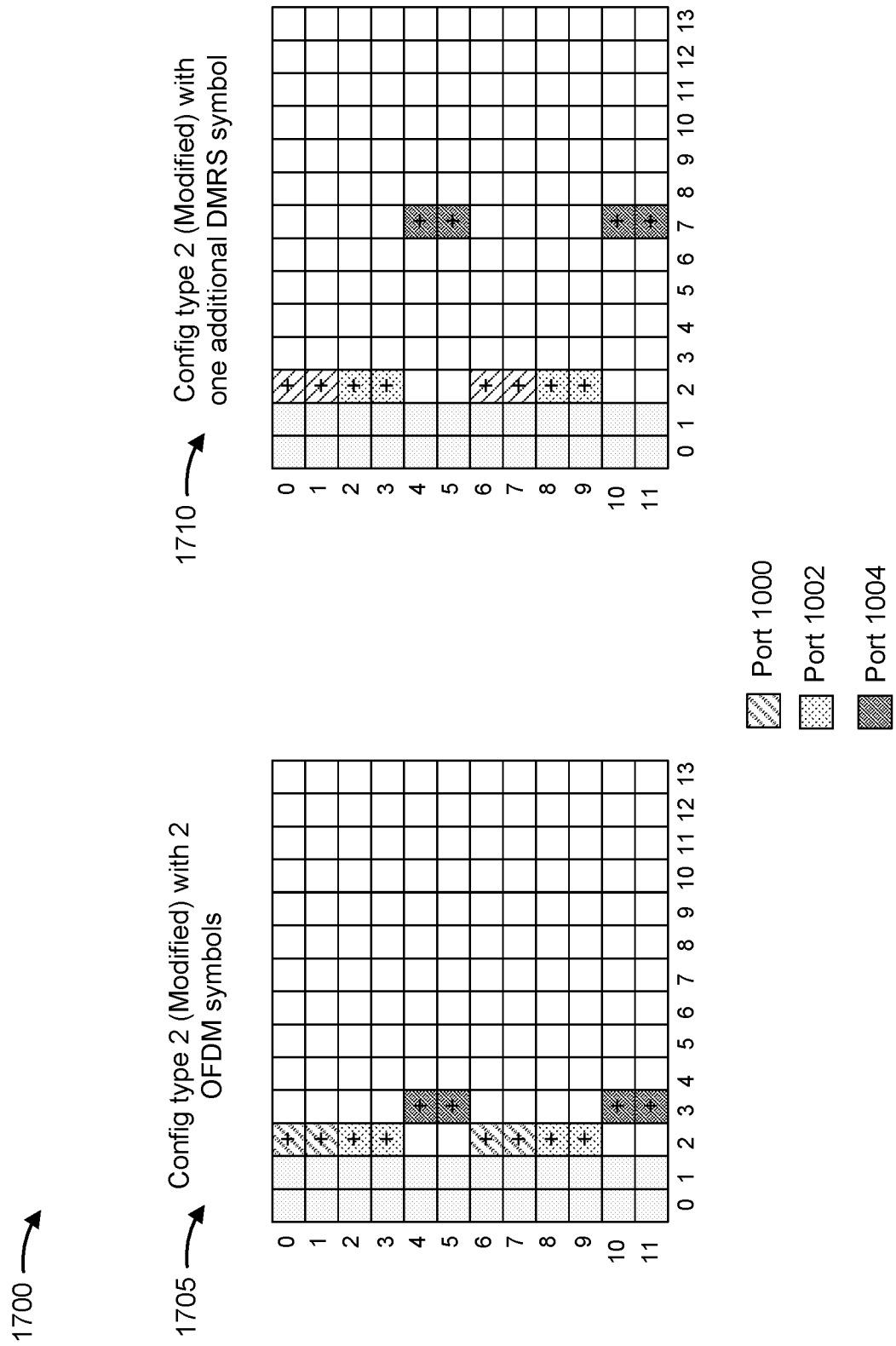

FIG. 17 is a diagram illustrating an example 1700 associated with DMRS design for large sub-carrier spacing, in accordance with various aspects of the present disclosure. As shown in FIG. 17, a modified second type of DMRS configuration may support a maximum of three CDM groups, with different sets of those CDM groups being used on different symbols. In this configuration, as an example, a first CDM group (CDM Group 0) and a second CDM group (CDM Group 1) may occupy a set or a subset of subcarriers on a first symbol, and a third CDM group (CDM Group 2) may occupy a set or a subset of subcarriers on a second symbol. The first CDM group may include multiple DMRS ports, such as DMRS port 0 (shown as Port 1000) and DMRS port 1, the second CDM group may also include multiple DMRS ports, such as DMRS port 2 (shown as Port 1002) and DMRS port 3, and the third CDM group may also include multiple DMRS ports, such as DMRS port 4 (shown as Port 1004) and DMRS port 5.

In some aspects, as shown by reference number 1705, this type of configuration may span two adjacent symbols. In this case, the first CDM group may occupy a set or a subset of subcarriers on a first symbol (shown as subcarriers 0, 1, 6, and 7 on symbol 2), the second CDM group may occupy a set or a subset of subcarriers on the first symbol (shown as subcarriers 2, 3, 8, and 9 on symbol 2), and the third CDM group may occupy a set or a subset of subcarriers on a second symbol (shown as subcarriers 4, 5, 10, and 11 on symbol 3). In this configuration, none of the CDM groups overlap in subcarriers, and the total set of CDM groups spans all subcarriers.

Alternatively, as shown by reference number 1710, this type of configuration may span two non-adjacent symbols (e.g., a single symbol DMRS configuration with an additional configured DMRS symbol). In this case, the first CDM group may occupy a set or a subset of subcarriers on a first symbol (shown as subcarriers 0, 1, 6, and 7 on symbol 2), the second CDM group may occupy a set or a subset of subcarriers on the first symbol (shown as subcarriers 2, 3, 8, and 9 on symbol 2), and the third CDM group may occupy a set or a subset of subcarriers on a second symbol (shown as subcarriers 4, 5, 10, and 11 on symbol 7). As described above, none of the CDM groups overlap in subcarriers, and the total set of CDM groups spans all subcarriers.

In some aspects, when this configuration is used, multiple DMRS ports may be combined into a single virtual port, as described elsewhere herein. In this way, denser DMRS coverage in the frequency domain may be achieved. Furthermore, multiple DMRS symbols, that use a legacy DMRS configuration, may be assigned with different DMRS ports. The multiple DMRS symbols can be consecutive or non-consecutive.

As indicated above, FIG. 17 is provided as an example. Other examples may differ from what is described with respect to FIG. 17.

Figure 18:
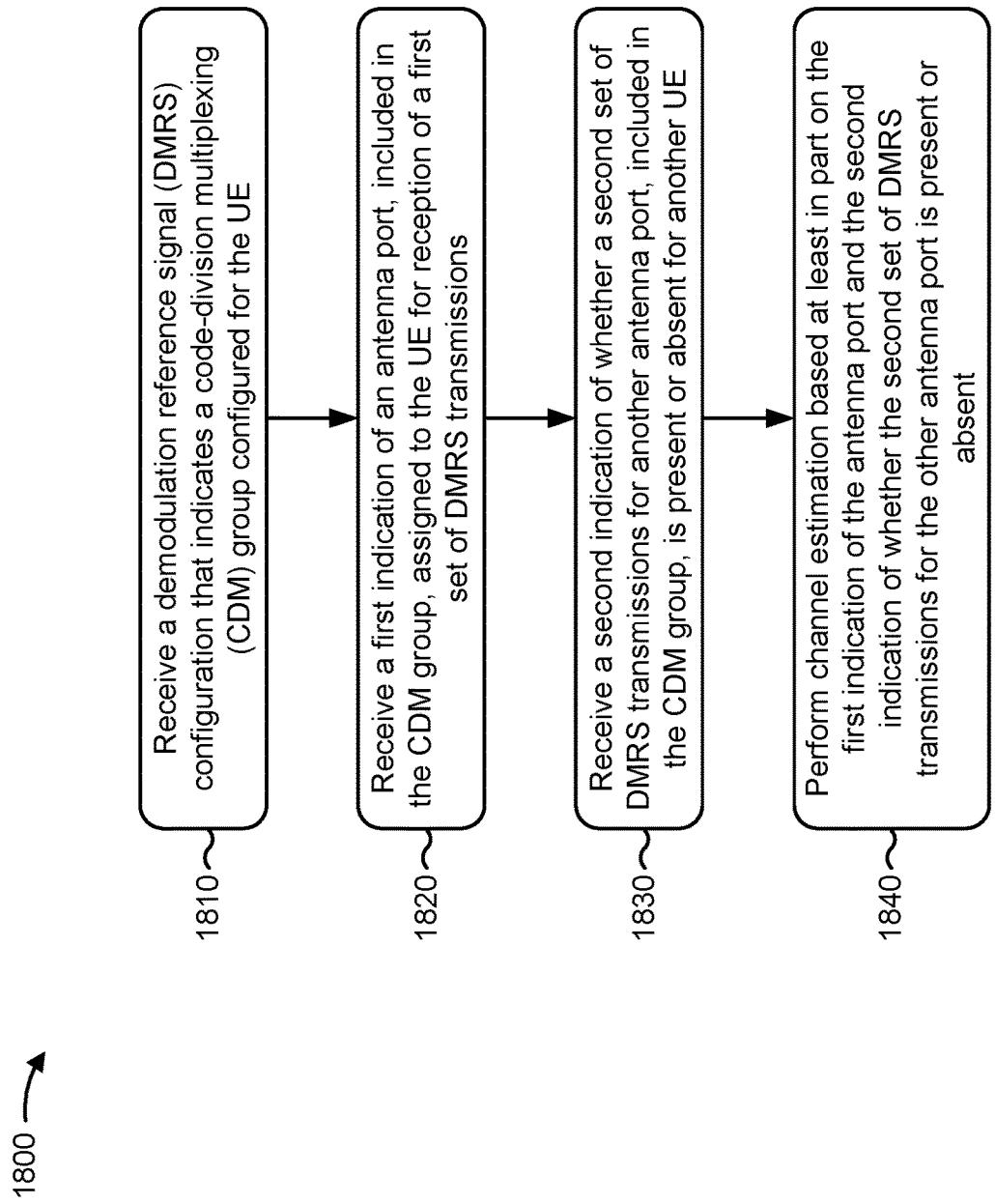
FIGS. 18-21 are diagrams illustrating example processes relating to DMRS design for large sub-carrier spacing, in accordance with the present disclosure.

FIG. 18 is a diagram illustrating an example process 1800 performed, for example, by a UE, in accordance with various aspects of the present disclosure. Example process 1800 is an example where the UE (e.g., UE 120 and/or the like) performs operations associated with demodulation reference signal design for large sub-carrier spacing.

As shown in FIG. 18, in some aspects, process 1800 may include receiving a DMRS configuration that indicates a CDM group configured for the UE (block 1810). For example, the UE (e.g., using receive processor 258, controller/processor 280, memory 282, and/or the like) may receive a DMRS configuration that indicates a CDM group configured for the UE, as described above.

As further shown in FIG. 18, in some aspects, process 1800 may include receiving a first indication of an antenna port, included in the CDM group, assigned to the UE for reception of a first set of DMRS transmissions (block 1820). For example, the UE (e.g., using receive processor 258, controller/processor 280, memory 282, and/or the like) may receive a first indication of an antenna port, included in the CDM group, assigned to the UE for reception of a first set of DMRS transmissions, as described above.

As further shown in FIG. 18, in some aspects, process 1800 may include receiving a second indication of whether a second set of DMRS transmissions for another antenna port, included in the CDM group, is present or absent for another UE (block 1830). For example, the UE (e.g., using receive processor 258, controller/processor 280, memory 282, and/or the like) may receive a second indication of whether a second set of DMRS transmissions for another antenna port, included in the CDM group, is present or absent for another UE, as described above.

As further shown in FIG. 18, in some aspects, process 1800 may include performing channel estimation based at least in part on the first indication of the antenna port and the second indication of whether the second set of DMRS transmissions for the other antenna port is present or absent (block 1840). For example, the UE (e.g., using receive processor 258, controller/processor 280, memory 282, and/or the like) may perform channel estimation based at least in part on the first indication of the antenna port and the second indication of whether the second set of DMRS transmissions for the other antenna port is present or absent, as described above.

Process 1800 may include additional aspects, such as any single aspect or any combination of aspects described below and/or in connection with one or more other processes described elsewhere herein.

In a first aspect, performing the channel estimation comprises one of: performing the channel estimation using an orthogonal cover code if the second set of DMRS transmissions for the other antenna port is present, or performing the channel estimation without using an orthogonal cover code if the second set of DMRS transmissions for the other antenna port is absent.

In a second aspect, alone or in combination with the first aspect, the second indication is included in downlink control information.

In a third aspect, alone or in combination with one or more of the first and second aspects, the first indication and the second indication are indicated using a same field of downlink control information.

In a fourth aspect, alone or in combination with one or more of the first through third aspects, the first indication and the second indication are indicated using a single value in downlink control information.

In a fifth aspect, alone or in combination with one or more of the first through fourth aspects, a single value in downlink control information indicates a number of CDM groups without data, the antenna port assigned to the UE, and whether the second set of DMRS transmissions for the other antenna port is present or absent for the other UE.

In a sixth aspect, alone or in combination with one or more of the first through fifth aspects, a first field in downlink control information includes the first indication, and a second field in the downlink control information includes the second indication.

In a seventh aspect, alone or in combination with one or more of the first through sixth aspects, the second field consists of a single bit.

In an eighth aspect, alone or in combination with one or more of the first through seventh aspects, a DMRS table, included in the DMRS configuration, that includes at least one of the first indication or the second indication is different for the UE as compared to the other UE.

In a ninth aspect, alone or in combination with one or more of the first through eighth aspects, the second indication is included in a configuration message that includes the DMRS configuration.

In a tenth aspect, alone or in combination with one or more of the first through ninth aspects, the configuration message is a radio resource control message.

In an eleventh aspect, alone or in combination with one or more of the first through tenth aspects, the second indication is based at least in part on a modulation and coding scheme (MCS) signaled to the UE in association with the first indication of the antenna port assigned to the UE.

In a twelfth aspect, alone or in combination with one or more of the first through eleventh aspects, the UE is configured to determine that the second set of DMRS transmissions is absent if an MCS index signaled to the UE satisfies a threshold, and the UE is configured to determine that the second set of DMRS transmissions is present if the MCS index does not satisfy the threshold.

In a thirteenth aspect, alone or in combination with one or more of the first through twelfth aspects, the threshold is signaled to the UE.

In a fourteenth aspect, alone or in combination with one or more of the first through thirteenth aspects, the second indication is included in at least one of a configuration message, downlink control information (DCI), activation DCI, a medium access control (MAC) control element, or a combination thereof.

In a fifteenth aspect, alone or in combination with one or more of the first through fourteenth aspects, the second indication is based at least in part on at least one of a subcarrier spacing, a delay spread, or a combination thereof.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
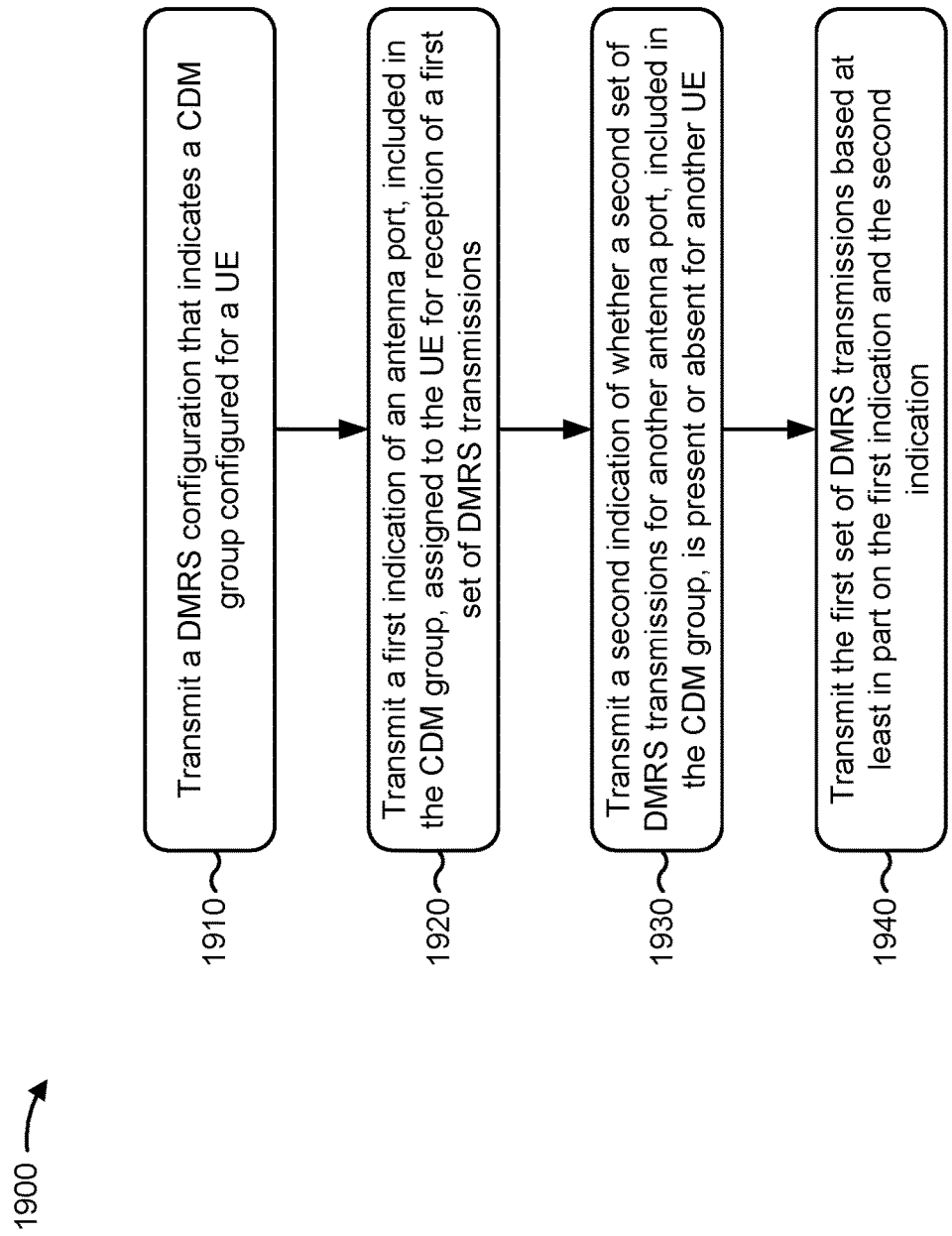

FIG. 19 is a diagram illustrating an example process 1900 performed, for example, by a base station, in accordance with various aspects of the present disclosure. Example process 1900 is an example where the base station (e.g., base station 110 and/or the like) performs operations associated with demodulation reference signal design for large subcarrier spacing.

As shown in FIG. 19, in some aspects, process 1900 may include transmitting a DMRS configuration that indicates a CDM group configured for a UE (block 1910). For example, the base station (e.g., using transmit processor 220, controller/processor 240, memory 242, and/or the like) may transmit a DMRS configuration that indicates a CDM group configured for a UE, as described above.

As further shown in FIG. 19, in some aspects, process 1900 may include transmitting a first indication of an antenna port, included in the CDM group, assigned to the UE for reception of a first set of DMRS transmissions (block 1920). For example, the base station (e.g., using transmit processor 220, controller/processor 240, memory 242, and/or the like) may transmit a first indication of an antenna port, included in the CDM group, assigned to the UE for reception of a first set of DMRS transmissions, as described above.

As further shown in FIG. 19, in some aspects, process 1900 may include transmitting a second indication of whether a second set of DMRS transmissions for another antenna port, included in the CDM group, is present or absent for another UE (block 1930). For example, the base station (e.g., using transmit processor 220, controller/processor 240, memory 242, and/or the like) may transmit a second indication of whether a second set of DMRS transmissions for another antenna port, included in the CDM group, is present or absent for another UE, as described above.

As further shown in FIG. 19, in some aspects, process 1900 may include transmitting the first set of DMRS transmissions based at least in part on the first indication and the second indication (block 1940). For example, the base station (e.g., using transmit processor 220, controller/processor 240, memory 242, and/or the like) may transmit the first set of DMRS transmissions based at least in part on the first indication and the second indication, as described above.

Process 1900 may include additional aspects, such as any single aspect or any combination of aspects described below and/or in connection with one or more other processes described elsewhere herein.

In a first aspect, the second indication is included in downlink control information.

In a second aspect, alone or in combination with the first aspect, the first indication and the second indication are indicated using a same field of downlink control information.

In a third aspect, alone or in combination with one or more of the first and second aspects, the first indication and the second indication are indicated using a single value in downlink control information.

In a fourth aspect, alone or in combination with one or more of the first through third aspects, a single value in downlink control information indicates a number of CDM groups without data, the antenna port assigned to the UE, and whether the second set of DMRS transmissions for the other antenna port is present or absent for the other UE.

In a fifth aspect, alone or in combination with one or more of the first through fourth aspects, a first field in downlink control information includes the first indication, and a second field in the downlink control information includes the second indication.

In a sixth aspect, alone or in combination with one or more of the first through fifth aspects, the second field consists of a single bit.

In a seventh aspect, alone or in combination with one or more of the first through sixth aspects, a DMRS table, included in the DMRS configuration, that includes at least one of the first indication or the second indication is different for the UE as compared to the other UE.

In an eighth aspect, alone or in combination with one or more of the first through seventh aspects, the second indication is included in a configuration message that includes the DMRS configuration.

In a ninth aspect, alone or in combination with one or more of the first through eighth aspects, the configuration message is a radio resource control message.

In a tenth aspect, alone or in combination with one or more of the first through ninth aspects, the second indication is based at least in part on an MCS signaled to the UE in association with the first indication of the antenna port assigned to the UE.

In an eleventh aspect, alone or in combination with one or more of the first through tenth aspects, the UE is configured to determine that the second set of DMRS transmissions is absent if an MCS index signaled to the UE satisfies a threshold, and the UE is configured to determine that the second set of DMRS transmissions is present if the MCS index does not satisfy the threshold.

In a twelfth aspect, alone or in combination with one or more of the first through eleventh aspects, the threshold is signaled to the UE.

In a thirteenth aspect, alone or in combination with one or more of the first through twelfth aspects, the second indication is included in at least one of a configuration message, DCI, activation DCI, a MAC control element, or a combination thereof.

In a fourteenth aspect, alone or in combination with one or more of the first through thirteenth aspects, the second indication is based at least in part on at least one of a subcarrier spacing, a delay spread, or a combination thereof.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
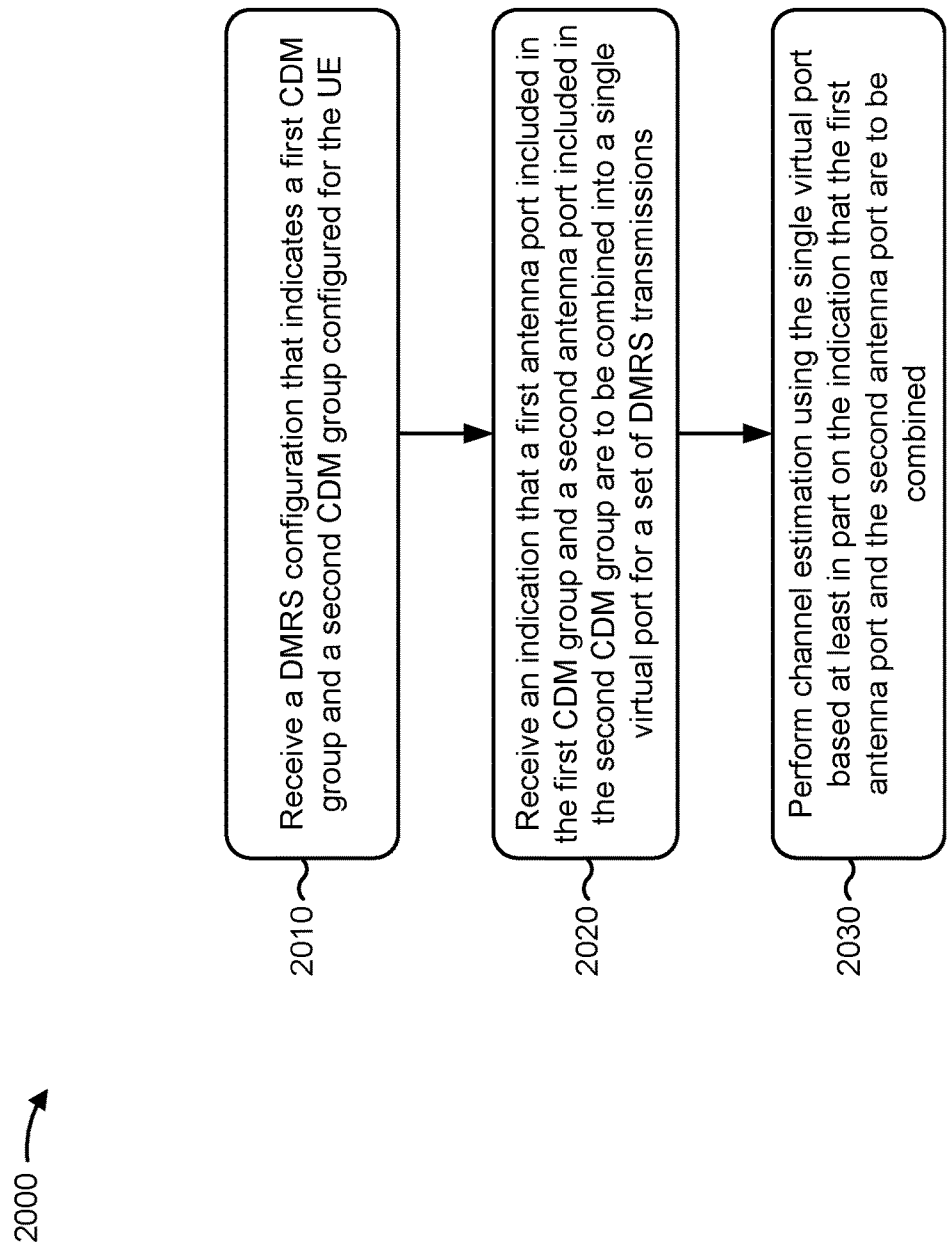

FIG. 20 is a diagram illustrating an example process 2000 performed, for example, by a UE, in accordance with various aspects of the present disclosure. Example process 2000 is an example where the UE (e.g., UE 120 and/or the like) performs operations associated with demodulation reference signal design for large sub-carrier spacing.

As shown in FIG. 20, in some aspects, process 2000 may include receiving a DMRS configuration that indicates a first CDM group and a second CDM group configured for the UE (block 2010). For example, the UE (e.g., using receive processor 258, controller/processor 280, memory 282, and/or the like) may receive a DMRS configuration that indicates a first CDM group and a second CDM group configured for the UE, as described above.

As further shown in FIG. 20, in some aspects, process 2000 may include receiving an indication that a first antenna port included in the first CDM group and a second antenna port included in the second CDM group are to be combined into a single virtual port for a set of DMRS transmissions (block 2020). For example, the UE (e.g., using receive processor 258, controller/processor 280, memory 282, and/or the like) may receive an indication that a first antenna port included in the first CDM group and a second antenna port included in the second CDM group are to be combined into a single virtual port for a set of DMRS transmissions, as described above.

As further shown in FIG. 20, in some aspects, process 2000 may include performing channel estimation using the single virtual port based at least in part on the indication that the first antenna port and the second antenna port are to be combined (block 2030). For example, the UE (e.g., using receive processor 258, controller/processor 280, memory 282, and/or the like) may perform channel estimation using the single virtual port based at least in part on the indication that the first antenna port and the second antenna port are to be combined, as described above.

Process 2000 may include additional aspects, such as any single aspect or any combination of aspects described below and/or in connection with one or more other processes described elsewhere herein.

In a first aspect, performing the channel estimation comprises performing the channel estimation on all subcarriers or resource elements in a scheduled resource block without using frequency domain interpolation.

In a second aspect, alone or in combination with the first aspect, the indication is included in the DMRS configuration, and the DMRS configuration indicates a DMRS configuration type that uses full frequency density DMRS transmissions.

In a third aspect, alone or in combination with one or more of the first and second aspects, the indication is included in downlink control information.

In a fourth aspect, alone or in combination with one or more of the first through third aspects, the first antenna port, the second antenna port, and the indication that the first antenna port and the second antenna port are to be combined are indicated using a same field of downlink control information.

In a fifth aspect, alone or in combination with one or more of the first through fourth aspects, the first antenna port, the second antenna port, and the indication that the first antenna port and the second antenna port are to be combined are indicated using a single value in downlink control information.

In a sixth aspect, alone or in combination with one or more of the first through fifth aspects, a single value in downlink control information indicates a number of CDM groups without data, the first antenna port, the second antenna port, and that the first antenna port and the second antenna port are to be combined.

In a seventh aspect, alone or in combination with one or more of the first through sixth aspects, a first field in downlink control information indicates the first antenna port and the second antenna port, and a second field in the downlink control information includes the indication that the first antenna port and the second antenna port are to be combined.

In an eighth aspect, alone or in combination with one or more of the first through seventh aspects, the second field consists of a single bit.

In a ninth aspect, alone or in combination with one or more of the first through eighth aspects, a DMRS table, included in the DMRS configuration, that includes the indication is different for the UE as compared to another UE.

In a tenth aspect, alone or in combination with one or more of the first through ninth aspects, the indication is included in a configuration message that includes the DMRS configuration.

In an eleventh aspect, alone or in combination with one or more of the first through tenth aspects, the configuration message is a radio resource control message.

In a twelfth aspect, alone or in combination with one or more of the first through eleventh aspects, the indication is based at least in part on an MCS signaled to the UE.

In a thirteenth aspect, alone or in combination with one or more of the first through twelfth aspects, the UE is configured to combine the first antenna port and the second antenna port if an MCS index signaled to the UE satisfies a threshold.

In a fourteenth aspect, alone or in combination with one or more of the first through thirteenth aspects, the threshold is signaled to the UE.

In a fifteenth aspect, alone or in combination with one or more of the first through fourteenth aspects, the indication is included in at least one of a configuration message, DCI, activation DCI, a MAC control element, or a combination thereof.

In a sixteenth aspect, alone or in combination with one or more of the first through fifteenth aspects, the set of DMRS transmissions on the single virtual port are contained within a single symbol.

In a seventeenth aspect, alone or in combination with one or more of the first through sixteenth aspects, the set of DMRS transmission on the single virtual port span multiple symbols.

In an eighteenth aspect, alone or in combination with one or more of the first through seventeenth aspects, the indication is based at least in part on at least one of a subcarrier spacing, a delay spread, or a combination thereof.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
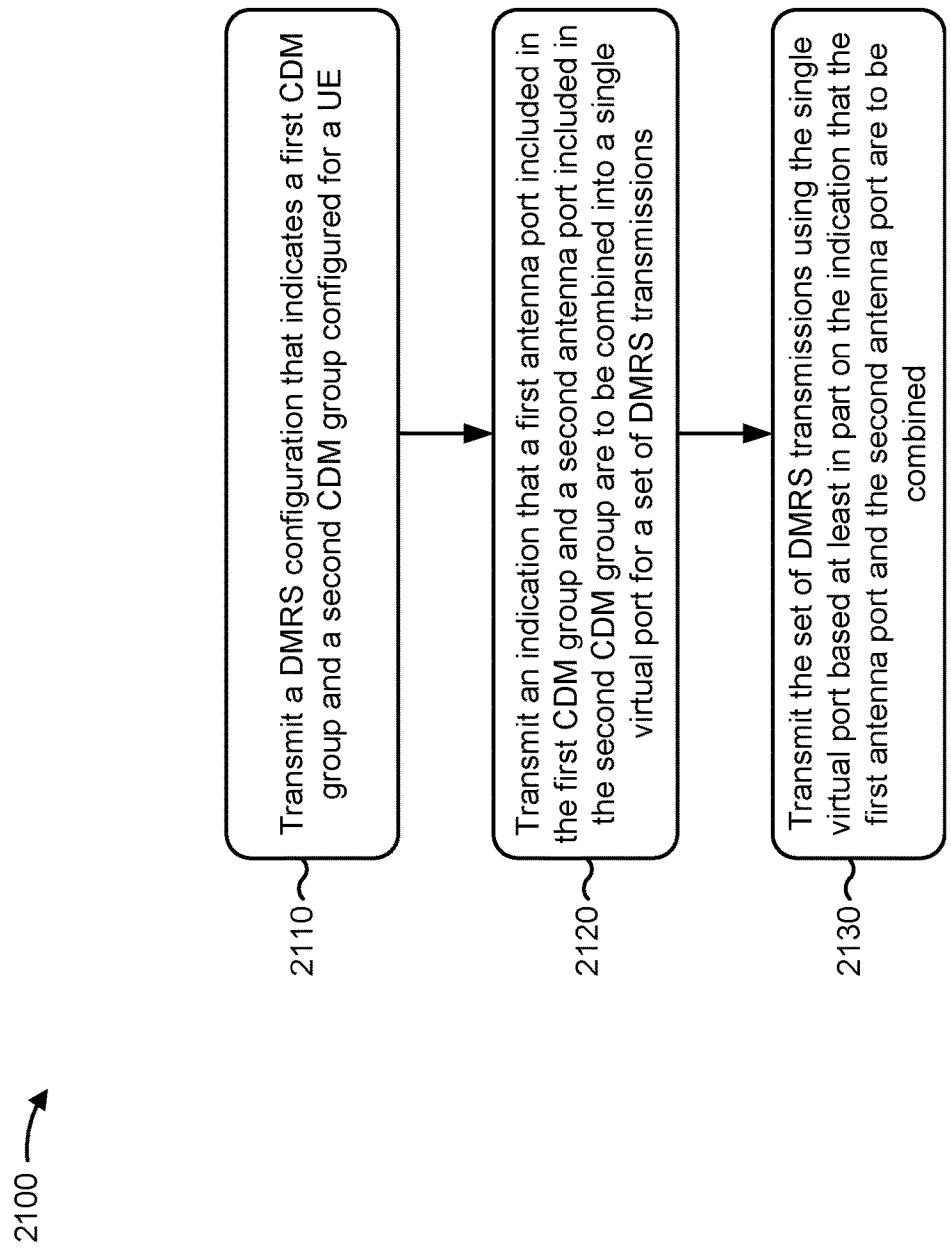

FIG. 21 is a diagram illustrating an example process 2100 performed, for example, by a base station, in accordance with various aspects of the present disclosure. Example process 2100 is an example where the base station (e.g., base station 110 and/or the like) performs operations associated with demodulation reference signal design for large subcarrier spacing.

As shown in FIG. 21, in some aspects, process 2100 may include transmitting a DMRS configuration that indicates a first CDM group and a second CDM group configured for a UE (block 2110). For example, the base station (e.g., using transmit processor 220, controller/processor 240, memory 242, and/or the like) may transmit a DMRS configuration that indicates a first CDM group and a second CDM group configured for a UE, as described above.

As further shown in FIG. 21, in some aspects, process 2100 may include transmitting an indication that a first antenna port included in the first CDM group and a second antenna port included in the second CDM group are to be combined into a single virtual port for a set of DMRS transmissions (block 2120). For example, the base station (e.g., using transmit processor 220, controller/processor 240, memory 242, and/or the like) may transmit an indication that a first antenna port included in the first CDM group and a second antenna port included in the second CDM group are to be combined into a single virtual port for a set of DMRS transmissions, as described above.

As further shown in FIG. 21, in some aspects, process 2100 may include transmitting the set of DMRS transmissions using the single virtual port based at least in part on the indication that the first antenna port and the second antenna port are to be combined (block 2130). For example, the base station (e.g., using transmit processor 220, controller/processor 240, memory 242, and/or the like) may transmit the set of DMRS transmissions using the single virtual port based at least in part on the indication that the first antenna port and the second antenna port are to be combined, as described above.

Process 2100 may include additional aspects, such as any single aspect or any combination of aspects described below and/or in connection with one or more other processes described elsewhere herein.

In a first aspect, the indication is included in the DMRS configuration, and the DMRS configuration indicates a DMRS configuration type that uses full frequency density DMRS transmissions.

In a second aspect, alone or in combination with the first aspect, the indication is included in downlink control information.

In a third aspect, alone or in combination with one or more of the first and second aspects, the first antenna port, the second antenna port, and the indication that the first antenna port and the second antenna port are to be combined are indicated using a same field of downlink control information.

In a fourth aspect, alone or in combination with one or more of the first through third aspects, the first antenna port, the second antenna port, and the indication that the first antenna port and the second antenna port are to be combined are indicated using a single value in downlink control information.

In a fifth aspect, alone or in combination with one or more of the first through fourth aspects, a single value in downlink control information indicates a number of CDM groups without data, the first antenna port, the second antenna port, and that the first antenna port and the second antenna port are to be combined.

In a sixth aspect, alone or in combination with one or more of the first through fifth aspects, a first field in downlink control information indicates the first antenna port and the second antenna port, and a second field in the downlink control information includes the indication that the first antenna port and the second antenna port are to be combined.

In a seventh aspect, alone or in combination with one or more of the first through sixth aspects, the second field consists of a single bit.

In an eighth aspect, alone or in combination with one or more of the first through seventh aspects, a DMRS table, included in the DMRS configuration, that includes the indication is different for the UE as compared to another UE.

In a ninth aspect, alone or in combination with one or more of the first through eighth aspects, the indication is included in a configuration message that includes the DMRS configuration.

In a tenth aspect, alone or in combination with one or more of the first through ninth aspects, the configuration message is a radio resource control message.

In an eleventh aspect, alone or in combination with one or more of the first through tenth aspects, the indication is based at least in part on an MCS signaled to the UE.

In a twelfth aspect, alone or in combination with one or more of the first through eleventh aspects, the UE is configured to combine the first antenna port and the second antenna port if an MCS index signaled to the UE satisfies a threshold.

In a thirteenth aspect, alone or in combination with one or more of the first through twelfth aspects, the threshold is signaled to the UE.

In a fourteenth aspect, alone or in combination with one or more of the first through thirteenth aspects, the indication is included in at least one of a configuration message, DCI, activation DCI, a MAC control element, or a combination thereof.

In a fifteenth aspect, alone or in combination with one or more of the first through fourteenth aspects, the set of DMRS transmissions on the single virtual port are contained within a single symbol.

In a sixteenth aspect, alone or in combination with one or more of the first through fifteenth aspects, the set of DMRS transmission on the single virtual port span multiple symbols.

In a seventeenth aspect, alone or in combination with one or more of the first through sixteenth aspects, the indication is based at least in part on at least one of a subcarrier spacing, a delay spread, or a combination thereof.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

The following provides an overview of some Aspects of the present disclosure:
Aspect 1: A method of wireless communication performed by a user equipment (UE), comprising: receiving a demodulation reference signal (DMRS) configuration that indicates a code-division multiplexing (CDM) group configured for the UE; receiving a first indication of an antenna port, included in the CDM group, assigned to the UE for reception of a first set of DMRS transmissions; receiving a second indication of whether a second set of DMRS transmissions for another antenna port, included in the CDM group, is present or absent for another UE; and performing channel estimation based at least in part on the first indication of the antenna port and the second indication of whether the second set of DMRS transmissions for the other antenna port is present or absent.

Aspect 2: The method of Aspect 1, wherein performing the channel estimation comprises one of: performing the channel estimation using an orthogonal cover code if the second set of DMRS transmissions for the other antenna port is present, or performing the channel estimation without using an orthogonal cover code if the second set of DMRS transmissions for the other antenna port is absent.

Aspect 3: The method of any of Aspects 1-2, wherein the second indication is included in downlink control information.

Aspect 4: The method of any of Aspects 1-3, wherein the first indication and the second indication are indicated using a same field of downlink control information.

Aspect 5: The method of any of Aspects 1-4, wherein the first indication and the second indication are indicated using a single value in downlink control information.

Aspect 6: The method of any of Aspects 1-5, wherein a single value in downlink control information indicates a number of CDM groups without data, the antenna port assigned to the UE, and whether the second set of DMRS transmissions for the other antenna port is present or absent for the other UE.

Aspect 7: The method of any of Aspects 1-2, wherein a first field in downlink control information includes the first indication, and wherein a second field in the downlink control information includes the second indication.

Aspect 8: The method of Aspect 7, wherein the second field consists of a single bit.

Aspect 9: The method of any of Aspects 1-8, wherein a DMRS table, included in the DMRS configuration, that includes at least one of the first indication or the second indication is different for the UE as compared to the other UE.

Aspect 10: The method of any of Aspects 1-9, wherein the second indication is included in a configuration message that includes the DMRS configuration.

Aspect 11: The method of Aspect 10, wherein the configuration message is a radio resource control message.

Aspect 12: The method of any of Aspects 1-11, wherein the second indication is based at least in part on a modulation and coding scheme (MCS) signaled to the UE in association with the first indication of the antenna port assigned to the UE.

Aspect 13: The method of Aspect 12, wherein the UE is configured to determine that the second set of DMRS transmissions is absent if an MCS index signaled to the UE satisfies a threshold, and wherein the UE is configured to determine that the second set of DMRS transmissions is present if the MCS index does not satisfy the threshold.

Aspect 14: The method of Aspect 13, wherein the threshold is signaled to the UE.

Aspect 15: The method of any of Aspects 1-14, wherein the second indication is included in at least one of a configuration message, downlink control information (DCI), activation DCI, a medium access control (MAC) control element, or a combination thereof.

Aspect 16: The method of any of Aspects 1-15, wherein the second indication is based at least in part on at least one of a subcarrier spacing, a delay spread, or a combination thereof.

Aspect 17: A method of wireless communication performed by a base station, comprising: transmitting a demodulation reference signal (DMRS) configuration that indicates a code-division multiplexing (CDM) group configured for a user equipment (UE); transmitting a first indication of an antenna port, included in the CDM group, assigned to the UE for reception of a first set of DMRS transmissions; transmitting a second indication of whether a second set of DMRS transmissions for another antenna port, included in the CDM group, is present or absent for another UE; and transmitting the first set of DMRS transmissions based at least in part on the first indication and the second indication.

Aspect 18: The method of Aspect 17, wherein the second indication is included in downlink control information.

Aspect 19: The method of any of Aspects 17-18, wherein the first indication and the second indication are indicated using a same field of downlink control information.

Aspect 20: The method of any of Aspects 17-19, wherein the first indication and the second indication are indicated using a single value in downlink control information.

Aspect 21: The method of any of Aspects 17-20, wherein a single value in downlink control information indicates a number of CDM groups without data, the antenna port assigned to the UE, and whether the second set of DMRS transmissions for the other antenna port is present or absent for the other UE.

Aspect 22: The method of any of Aspects 17-18, wherein a first field in downlink control information includes the first indication, and wherein a second field in the downlink control information includes the second indication.

Aspect 23: The method of Aspect 22, wherein the second field consists of a single bit.

Aspect 24: The method of any of Aspects 17-23, wherein a DMRS table, included in the DMRS configuration, that includes at least one of the first indication or the second indication is different for the UE as compared to the other UE.

Aspect 25: The method of any of Aspects 17-24, wherein the second indication is included in a configuration message that includes the DMRS configuration.

Aspect 26: The method of Aspect 25, wherein the configuration message is a radio resource control message.

Aspect 27: The method of any of Aspects 17-26, wherein the second indication is based at least in part on a modulation and coding scheme (MCS) signaled to the UE in association with the first indication of the antenna port assigned to the UE.

Aspect 28: The method of Aspect 27, wherein the UE is configured to determine that the second set of DMRS transmissions is absent if an MCS index signaled to the UE satisfies a threshold, and wherein the UE is configured to determine that the second set of DMRS transmissions is present if the MCS index does not satisfy the threshold.

Aspect 29: The method of Aspect 28, wherein the threshold is signaled to the UE.

Aspect 30: The method of any of Aspects 17-29, wherein the second indication is included in at least one of a configuration message, downlink control information (DCI), activation DCI, a medium access control (MAC) control element, or a combination thereof.

Aspect 31: The method of any of Aspects 17-30, wherein the second indication is based at least in part on at least one of a subcarrier spacing, a delay spread, or a combination thereof.

Aspect 32: A method of wireless communication performed by a user equipment (UE), comprising: receiving a demodulation reference signal (DMRS) configuration that indicates a first code-division multiplexing (CDM) group and a second CDM group configured for the UE; receiving an indication that a first antenna port included in the first CDM group and a second antenna port included in the second CDM group are to be combined into a single virtual port for a set of DMRS transmissions; and performing channel estimation using the single virtual port based at least in part on the indication that the first antenna port and the second antenna port are to be combined.

Aspect 33: The method of Aspect 32, wherein performing the channel estimation comprises performing the channel estimation on all subcarriers or resource elements in a scheduled resource block without using frequency domain interpolation.

Aspect 34: The method of any of Aspects 32-33, wherein the indication is included in the DMRS configuration, wherein the DMRS configuration indicates a DMRS configuration type that uses full frequency density DMRS transmissions.

Aspect 35: The method of any of Aspects 32-34, wherein the indication is included in downlink control information.

Aspect 36: The method of any of Aspects 32-35, wherein the first antenna port, the second antenna port, and the indication that the first antenna port and the second antenna port are to be combined are indicated using a same field of downlink control information.

Aspect 37: The method of any of Aspects 32-36, wherein the first antenna port, the second antenna port, and the indication that the first antenna port and the second antenna port are to be combined are indicated using a single value in downlink control information.

Aspect 38: The method of any of Aspects 32-37, wherein a single value in downlink control information indicates a number of CDM groups without data, the first antenna port, the second antenna port, and that the first antenna port and the second antenna port are to be combined.

Aspect 39: The method of any of Aspects 32-35, wherein a first field in downlink control information indicates the first antenna port and the second antenna port, and wherein a second field in the downlink control information includes the indication that the first antenna port and the second antenna port are to be combined.

Aspect 40: The method of Aspect 39, wherein the second field consists of a single bit.

Aspect 41: The method of any of Aspects 32-40, wherein a DMRS table, included in the DMRS configuration, that includes the indication is different for the UE as compared to another UE.

Aspect 42: The method of any of Aspects 32-41, wherein the indication is included in a configuration message that includes the DMRS configuration.

Aspect 43: The method of Aspect 42, wherein the configuration message is a radio resource control message.

Aspect 44: The method of any of Aspects 32-43, wherein the indication is based at least in part on a modulation and coding scheme (MCS) signaled to the UE.

Aspect 45: The method of Aspect 44, wherein the UE is configured to combine the first antenna port and the second antenna port if an MCS index signaled to the UE satisfies a threshold.

Aspect 46: The method of Aspect 45, wherein the threshold is signaled to the UE.

Aspect 47: The method of any of Aspects 32-46, wherein the indication is included in at least one of a configuration message, downlink control information (DCI), activation DCI, a medium access control (MAC) control element, or a combination thereof.

Aspect 48: The method of any of Aspects 32-47, wherein the set of DMRS transmissions on the single virtual port are contained within a single symbol.

Aspect 49: The method of any of Aspects 32-47, wherein the set of DMRS transmission on the single virtual port span multiple symbols.

Aspect 50: The method of any of Aspects 32-49, wherein the indication is based at least in part on at least one of a subcarrier spacing, a delay spread, or a combination thereof.

Aspect 51: A method of wireless communication performed by a base station, comprising: transmitting a demodulation reference signal (DMRS) configuration that indicates a first code-division multiplexing (CDM) group and a second CDM group configured for a user equipment (UE); transmitting an indication that a first antenna port included in the first CDM group and a second antenna port included in the second CDM group are to be combined into a single virtual port for a set of DMRS transmissions; and transmitting the set of DMRS transmissions using the single virtual port based at least in part on the indication that the first antenna port and the second antenna port are to be combined.

Aspect 52: The method of Aspect 51, wherein the indication is included in the DMRS configuration, wherein the DMRS configuration indicates a DMRS configuration type that uses full frequency density DMRS transmissions.

Aspect 53: The method of any of Aspects 51-52, wherein the indication is included in downlink control information.

Aspect 54: The method of any of Aspects 51-53, wherein the first antenna port, the second antenna port, and the indication that the first antenna port and the second antenna port are to be combined are indicated using a same field of downlink control information.

Aspect 55: The method of any of Aspects 51-54, wherein the first antenna port, the second antenna port, and the indication that the first antenna port and the second antenna port are to be combined are indicated using a single value in downlink control information.

Aspect 56: The method of any of Aspects 51-55, wherein a single value in downlink control information indicates a number of CDM groups without data, the first antenna port, the second antenna port, and that the first antenna port and the second antenna port are to be combined.

Aspect 57: The method of any of Aspects 51-53, wherein a first field in downlink control information indicates the first antenna port and the second antenna port, and wherein a second field in the downlink control information includes the indication that the first antenna port and the second antenna port are to be combined.

Aspect 58: The method of Aspect 57, wherein the second field consists of a single bit.

Aspect 59: The method of any of Aspects 51-58, wherein a DMRS table, included in the DMRS configuration, that includes the indication is different for the UE as compared to another UE.

Aspect 60: The method of any of Aspects 51-59, wherein the indication is included in a configuration message that includes the DMRS configuration.

Aspect 61: The method of Aspect 60, wherein the configuration message is a radio resource control message.

Aspect 62: The method of any of Aspects 51-61, wherein the indication is based at least in part on a modulation and coding scheme (MCS) signaled to the UE.

Aspect 63: The method of Aspect 62, wherein the UE is configured to combine the first antenna port and the second antenna port if an MCS index signaled to the UE satisfies a threshold.

Aspect 64: The method of Aspect 63, wherein the threshold is signaled to the UE.

Aspect 65: The method of any of Aspects 51-64, wherein the indication is included in at least one of a configuration message, downlink control information (DCI), activation DCI, a medium access control (MAC) control element, or a combination thereof.

Aspect 66: The method of any of Aspects 51-65, wherein the set of DMRS transmissions on the single virtual port are contained within a single symbol.

Aspect 67: The method of any of Aspects 51-65, wherein the set of DMRS transmission on the single virtual port span multiple symbols.

Aspect 68: The method of any of Aspects 51-67, wherein the indication is based at least in part on at least one of a subcarrier spacing, a delay spread, or a combination thereof.

Aspect 69: An apparatus for wireless communication at a device, comprising a processor; memory coupled with the processor; and instructions stored in the memory and executable by the processor to cause the apparatus to perform the method of one or more Aspects of Aspects 1-16 and/or 32-50.

Aspect 70: A device for wireless communication, comprising a memory and one or more processors coupled to the memory, the memory and the one or more processors configured to perform the method of one or more Aspects of Aspects 1-16 and/or 32-50.

Aspect 71: An apparatus for wireless communication, comprising at least one means for performing the method of one or more Aspects of Aspects 1-16 and/or 32-50.

Aspect 72: A non-transitory computer-readable medium storing code for wireless communication, the code comprising instructions executable by a processor to perform the method of one or more Aspects of Aspects 1-16 and/or 32-50.

Aspect 73: A non-transitory computer-readable medium storing a set of instructions for wireless communication, the set of instructions comprising one or more instructions that, when executed by one or more processors of a device, cause the device to perform the method of one or more Aspects of Aspects 1-16 and/or 32-50.

Aspect 74: An apparatus for wireless communication at a device, comprising a processor; memory coupled with the processor; and instructions stored in the memory and executable by the processor to cause the apparatus to perform the method of one or more Aspects of Aspects 17-31 and/or 51-68.

Aspect 75: A device for wireless communication, comprising a memory and one or more processors coupled to the memory, the memory and the one or more processors configured to perform the method of one or more Aspects of Aspects 17-31 and/or 51-68.

Aspect 76: An apparatus for wireless communication, comprising at least one means for performing the method of one or more Aspects of Aspects 17-31 and/or 51-68.

Aspect 77: A non-transitory computer-readable medium storing code for wireless communication, the code comprising instructions executable by a processor to perform the method of one or more Aspects of Aspects 17-31 and/or 51-68.

Aspect 78: A non-transitory computer-readable medium storing a set of instructions for wireless communication, the set of instructions comprising one or more instructions that, when executed by one or more processors of a device, cause the device to perform the method of one or more Aspects of Aspects 17-31 and/or 51-68.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a demodulation reference signal (DMRS) configuration that indicates a code-division multiplexing (CDM) group configured for the UE;
   receiving a first indication of a first antenna port for reception of a first set of DMRS transmissions;
   receiving a second indication that remaining orthogonal antenna ports in the CDM group are not associated with a physical downlink shared channel (PDSCH) transmission to another UE, wherein the second indication is based at least in part on a modulation and coding scheme (MCS) signaled to the UE in association with the first indication; and
   determining, based at least in part on the second indication and the UE being scheduled with two codewords, that the remaining orthogonal antenna ports in the CDM group are not associated with the PDSCH transmission to the other UE.

2. The method of claim 1, wherein the second indication is included in a radio resource control message.

3. The method of claim 1, wherein a single value in downlink control information indicates:
   a quantity of CDM groups without data,
   that the first antenna port is assigned to the UE, and that a second set of DMRS transmissions is absent at a second antenna port for the other UE.

4. The method of claim 1, wherein a first field in downlink control information includes the first indication.

5. The method of claim 1, further comprising:
   determining that a second set of DMRS transmissions is absent at a second antenna port for the other UE based at least in part on an MCS index.

6. The method of claim 1, wherein the first indication indicates that the first antenna port is assigned to the UE for reception of the first set of DMRS transmissions.

7. The method of claim 1, further comprising:
   receiving the first set of DMRS transmissions based at least in part on the first indication.

8. A method of wireless communication performed by a user equipment (UE), comprising:
   receiving a demodulation reference signal (DMRS) configuration that indicates a code-division multiplexing (CDM) group configured for the UE;
   receiving a first indication of a first antenna port for reception of a first set of DMRS transmissions;
   receiving a second indication that the remaining orthogonal antenna ports in the CDM group are not associated with a physical downlink shared channel (PDSCH) transmission to another UE, wherein the second indication is based at least in part on at least one of a subcarrier spacing or a delay spread; and
   determining, based at least in part on the second indication and the UE being scheduled with two codewords, that remaining orthogonal antenna ports in the CDM group are not associated with the PDSCH transmission to the other UE.

9. A user equipment (UE) for wireless communication, comprising:
   a memory; and
   one or more processors coupled to the memory, wherein the UE is configured to:
      receive a demodulation reference signal (DMRS) configuration that indicates a code-division multiplexing (CDM) group configured for the UE;
      receive a first indication of a first antenna port for reception of a first set of DMRS transmissions;
      receive a second indication that remaining orthogonal antenna ports in the CDM group are not associated with a physical downlink shared channel (PDSCH) transmission to another UE, wherein the second indication is based at least in part on a modulation and coding scheme (MCS) signaled to the UE in association with the first indication; and
      determine, based at least in part on the second indication and the UE being scheduled with two codewords, that remaining orthogonal antenna ports in the CDM group are not associated with the PDSCH transmission to the other UE.

10. The UE of claim 9, wherein the second indication is included in downlink control information, and wherein the first indication and the second indication are indicated using at least one of a same field or a single value in the downlink control information.

11. The UE of claim 9, wherein a single value in downlink control information indicates:
    a quantity of CDM groups without data,
    that the first antenna port is assigned to the UE, and that a second set of DMRS transmissions is absent at a second antenna port for the other UE.

12. The UE of claim 9, wherein a first field in downlink control information includes the first indication.

13. The UE of claim 9, wherein the UE is further configured to:
    determine that a second set of DMRS transmissions is absent at a second antenna port for the other UE based at least in part on an MCS index.

14. The UE of claim 9, wherein the first indication indicates that the first antenna port is assigned to the UE for reception of the first set of DMRS transmissions.

15. A user equipment (UE) for wireless communication, comprising:
    a memory; and
    one or more processors coupled to the memory, wherein the UE is configured to:
       receive a demodulation reference signal (DMRS) configuration that indicates a code-division multiplexing (CDM) group configured for the UE;
       receive a first indication of a first antenna port for reception of a first set of DMRS transmissions;
       receive a second indication that the remaining orthogonal antenna ports in the CDM group are not associated with a physical downlink shared channel (PDSCH) transmission to another UE, wherein the second indication is based at least in part on at least one of a subcarrier spacing or a delay spread; and
       determine, based at least in part on the second indication and the UE being scheduled with two codewords, that remaining orthogonal antenna ports in the CDM group are not associated with the PDSCH transmission to the other UE.

\* \* \* \* \*